US009323936B2

(12) United States Patent
Quong

(10) Patent No.: US 9,323,936 B2
(45) Date of Patent: Apr. 26, 2016

(54) USING A FILE WHITELIST

(71) Applicant: Google Inc., Mountian View, CA (US)

(72) Inventor: Russell Quong, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/833,029

(22) Filed: Mar. 15, 2013

(65) Prior Publication Data

US 2014/0283110 A1 Sep. 18, 2014

(51) Int. Cl.

| | |
|---|---|
| ***G06F 7/04*** | (2006.01) |
| ***G06F 17/30*** | (2006.01) |
| ***H04N 7/16*** | (2011.01) |
| ***G06F 21/60*** | (2013.01) |
| ***G06F 21/51*** | (2013.01) |
| *H04L 29/06* | (2006.01) |

(52) U.S. Cl.

CPC ................ *G06F 21/60* (2013.01); *G06F 21/51* (2013.01); *H04L 63/101* (2013.01); *H04L 63/12* (2013.01)

(58) Field of Classification Search

CPC ........................................................ H04L 29/06

USPC ............................................................ 726/27

See application file for complete search history.

(56) References Cited

U.S. PATENT DOCUMENTS

| | | | | |
|---|---|---|---|---|
| 8,973,090 | B1 * | 3/2015 | Banerjee | 726/1 |
| 2009/0288145 | A1 | 11/2009 | Huber et al. | |
| 2010/0162126 | A1 | 6/2010 | Donaldson et al. | |
| 2011/0083069 | A1 | 4/2011 | Paul et al. | |
| 2012/0036552 | A1 | 2/2012 | Dare et al. | |
| 2012/0069131 | A1 | 3/2012 | Abelow | |
| 2012/0180073 | A1 | 7/2012 | Hung | |
| 2012/0209923 | A1 * | 8/2012 | Mathur et al. | 709/206 |

OTHER PUBLICATIONS

Shengli Wu; Authorization and Access Control of Application Data in Workflow Systems; Year:2002; Journal of Intelligent Information Systems, 18 (1). pp. 71-94.*

* cited by examiner

*Primary Examiner* — Monjour Rahim

(74) *Attorney, Agent, or Firm* — Morris & Kamlay LLP

(57) ABSTRACT

A method and/or system for using a file whitelist may include receiving a request to approve an application for release in an application store. The request may comprise application data. The application data may comprise a resource manifest and/or a file whitelist. The resource manifest may comprise, for example, one or more resource items. The file whitelist may comprise, for example, one or more file items. The request may be analyzed based on application data. A determination may be made whether the applications may be released in the application store based on the analyzing of the applications data. A request to access a particular file may be received. A determination of whether to grant the request may be based on a resource manifest and/or a file whitelist associated with the application.

16 Claims, 6 Drawing Sheets

USING A FILE WHITELIST

TECHNICAL FIELD

Aspects of the present application relate to electronic devices. More specifically, certain implementations of the present disclosure relate to a method and/or system for using a file whitelist.

BACKGROUND

Various types of electronic devices are now commonly utilized. In this regard, electronic devices may include, for example, personal and non-personal devices, mobile and non-mobile devices, communication (wired and/or wireless) devices, general and special purpose devices. Examples of electronic devices may comprise cellular phones, smartphones, tablets, personal computers, laptops and the like. In some instances, various applications may run on the electronic devices. The applications may be directed to game application, personal applications and/or business applications.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for using a file whitelist, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
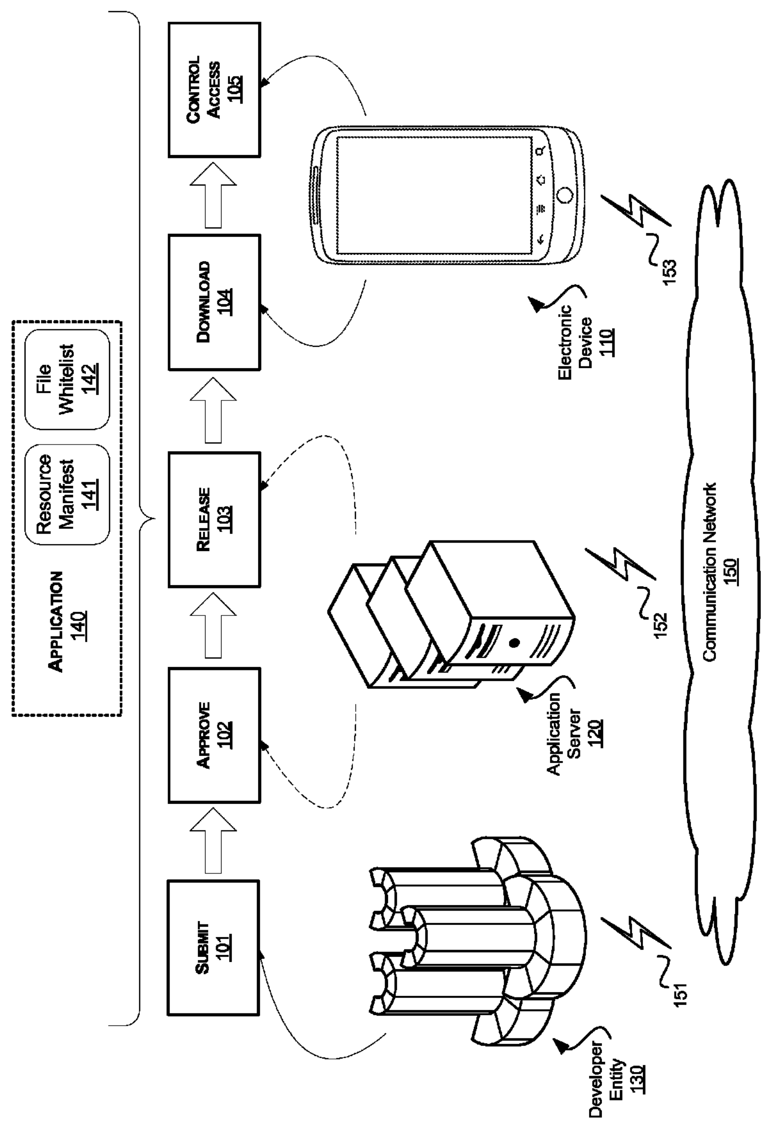
FIG. 1 is a block diagram of an example system for using a file whitelist, in accordance with an example embodiment of the disclosure.

Certain embodiments of the disclosure may be found in a method and/or system for using a file whitelist. In various embodiments of the disclosure, a method and/or system for using a file whitelist may include receiving a request to approve an application for release in an application store, where the application may be associated with an application developer. The request may comprise application data. The application data may comprise a resource manifest and/or a file whitelist. The resource manifest may comprise, for example, one or more resource items. The file whitelist may comprise, for example, one or more file items.

The request may be analyzed based on application data. A determination may be made whether the application may be released in the application store based on the analyzing of the application data.

In an example embodiment of the disclosure, an approved application may be released to the application store in response to the request to approve the application for release in the application store. The approved application may comprise an approved resource manifest and/or an approved file whitelist. The approved resource manifest may comprise, for example, one or more approved resource items. The approved file whitelist may comprise, for example, one or more approved file items. In an example embodiment of the disclosure, at least one of the file items may not correspond to any of the one or more approved file items. For example, one or more of the file items on the file whitelist may not be included on the approved file whitelist as the approved file items.

In an example embodiment of the disclosure, application receipt data may be communicated to the applications developer, where the application receipt data may comprise data indicative of whether the application was approved for release in an application store. The application data may comprise information data and option data. The information data may indicate that the application may be released in the applications store as an approved application. The option data may provide an option to the application developer to approve the release of the application in the application store as the approved application. The approved application may comprise an approved resource manifest and/or an approved file whitelist. The approved resource manifest may comprise, for example, one or more approved resource items. The approved file whitelist may comprise, for example, one or more approved file items. In an example embodiment of the disclosure, at least one of the file items may not correspond to any of the one or more approved file items. For example, one or more of the file items on the file whitelist may not be included on the approved file whitelist as the approved file items.

In an example embodiment of the disclosure, modification approval data may be received from the application developer, where the modification approval data may comprise an approval by the application developer to release the application in the application store as the approved application.

In an example embodiment of the disclosure, a request to access the application may be received from an electronic device. A response to the request to access the mobile application may be sent to the electronic device, wherein the response comprises the application data.

In various embodiments of the disclosure, a method and/or system for using a file whitelist may include receiving, from an application, a request to access a particular file. The request may compromise n access action (e.g., read file operation, write file operation, etc.). A resource associated with the particular file may be determined. A resource manifest associated with the application may be determined, where the resource manifest may comprise one or more resource items.

A determination whether the resource corresponds to at least one of the one or more resource items may be made. In a case where the resource corresponds to at least one of the one or more resource items, one or more of the following steps (a)-(d) may be performed: (a) a file whitelist associated with the application may be determined, where the file whitelist may comprises one or more file items, where each of the one or more file items may comprise a file path and one or more file operations associated with the file path; (b) a determination whether the particular file corresponds to a file path of at least one of the one or more file items may be made; (c) in a case where the particular file corresponds to a file path of at least one of the one or more file items, the following steps (i)-(iii) may be performed: (i) a determination whether the access action corresponds to at least one file operation associated with the file path may be made; (ii) if the access action corresponds to at least one file operation associated with the file path, the request to access the particular file may be granted; and/or (iii) if the access action does not correspond to at least one file operation associated with the file path, the request to access the particular file may be denied; and/or (d) in a case where the particular file does not correspond to any one of the one or more file items, the request to access the particular file may be denied.

In an example embodiment of the disclosure, in a case where the resource does not correspond to any one of the one or more resource items, the request to access the particular file may be denied.

In an example embodiment of the disclosure, in a case where the particular file does not correspond to any one of the one or more file items, a notification on the electronic device may be presented, where the notification may comprise information indicative of the denial of the request to access the particular file.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "block" refers to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

As utilized herein, the term "file" may comprise one or more files, file directories and/or other entities that reside within a file system. A "file" may be subject to "file operations", such as for example, read, write, list, etc. A file operation may apply to, for example, one or more files (e.g., predefined files) and/or any file in a particular predefined file directory (e.g., file(s) that may be found and/or identified in a file path that meets a predefined pattern). As utilized herein, the term "path" (or "file path") may comprise an identifier for a "file" (e.g., where and how the file may be accessed). It is to be understood that an implementation (e.g., syntax, compression, etc.) of a "file," "file path" and/or "file operation(s)" may depend on a file system. For example a Unix file system may be associated with an example file path "/ext/app/data.txt," a DOS file system may be associated with an example file path "C:\app\data.txt," etc. The present disclosure is not limited to a particular implementation of a file, file path, file system and/or file operation.

FIG. 1 is a block diagram of an example system for using a file whitelist, in accordance with an example embodiment of the disclosure. Referring to FIG. 1, there is shown a system 100 for using a file whitelist. The system 100 may comprise an electronic device 110, an application server 120, a developer entity 130, an application 140 and/or a communication network 150.

The electronic device 110 may comprise suitable logic, circuitry, interfaces, and/or code that may be operable to communicate data and/or messages via wired and/or wireless connections configured in accordance with one or more supported wireless and or wired protocols, standards and/or interfaces (e.g., Ethernet, Bluetooth, WiFi, cellular, WiMAX, WLAN, NFC, etc.). The electronic device 110 may be operable to process, generate, present and/or output data and/or messages. The electronic device 110 may be enabled to perform, run, and/or execute various functions, operations, applications and/or programs based on, for example, user instructions and/or interactions, and/or pre-configured instructions. In this regard, the electronic device 110 may be operable to communicate, for example, with the application server 120 and/or the developer entity 130.

The electronic device 110 may comprise a cellular phone, smartphone, tablet, set-top box, television, laptop computer, desktop and/or personal computer, personal media player, other device which may communicate, process, generate, present and/or output data and/or other device that supports using a file whitelist. The disclosure, and/or any implementation(s) in accordance therewith, however, are not limited to any particular type of an electronic device. The electronic device 110 may, for example, comprise the electronic device 200 as depicted in and/or described with respect to FIG. 2.

The application server 120 may comprise suitable logic, circuitry, interfaces, and/or code that may be operable to provide application approval services and/or application upsell services. For example the application server 120 may be enabled to provide application acceptance, screening (e.g., resource manifest evaluation, file whitelist evaluation, etc.), processing, management and/or upsell (e.g., providing purchasing options to users of electronic devices (e.g., the electronic device 110) for purchasing applications submitted by, for example, a developer entity (e.g., the developer entity 130), etc.).

The application server 120 may also be operable to provide products and/or services related to an application store, such as, for example, managing applications in an application store for advertising and/or sale to users of electronic devices (e.g., the electronic device 110).

The application server 120 may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC, etc.) with electronic devices (e.g., the electronic device 110), developer entities (e.g., the developer entity 130) and/or other computing devices and/or entities. The application server 120 may be enabled to process, store, manage and/or communicate data and/or messages relevant to providing application approval and/or management services to developer entities (e.g., the developer entity 130) and/or application upsell services to electronic devices (e.g., the electronic device 110). Furthermore, the application server 120 may be operable to provide communication services to and from the electronic device 110, the developer entity 130 and/or other computing devices and/or entities. For example, the application server 120 may include one or more transceivers for providing wired and/or wireless communication of data to and from the electronic device 110, the developer entity 130 and/or other computing devices and/or entities via a communication network (e.g., the communication network 150) and/ or one or more of the communication links (e.g., the communication link 151, 152 and/or 153).

The application server 120 may comprise a dedicated system and/or a general purpose system configured to provide application approval services (e.g., resource manifest evaluation, file whitelist evaluation, etc.) to developer entities (e.g., the developer entity 130) and/or application upsell services (e.g., downloading, purchasing, etc.) to electronic device (e.g., the electronic device 110). The application server 120 may, for example, comprise the application server 300 as depicted in and/or described with respect to FIG. 3. The disclosure, and/or any implementation(s) in accordance therewith, however, are not limited to any particular type of an application server.

The developer entity 130 may comprise suitable logic, circuitry, interfaces, and/or code that may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC, etc.). The developer entity 130 may be operable to process, generate, present and/or output data and/or messages. The developer entity 130 may be enabled to perform, run, and/or execute various functions, operations, applications and/or programs based on, for example, user instructions and/or interactions, and/or pre-configured instructions. In this regard, the developer entity 130 may be operable to communicate, for example, with the electronic device 110 and/or the application server 120.

In an example embodiment of the disclosure, the developer entity 130 may be operable to communicate with the application server 120 through an application programming interface (API). In another example embodiment of the disclosure, the developer entity 130 may communicate with the application server via an on-line (e.g., web browser) interface. The API and/or the web interface may be provided and/or supported by an application server, such as, for example, the application server 120. In this regard, the developer entity 130 may be operable to automatically and/or in response to a user interaction send, utilizing, for example, the API and/or the web interface, a request to the application server 120, for the application server 120 to approve an application, such as, for example, the application 140, for release in an application store. The disclosure, and/or any implementation(s) in accordance therewith are not limited to any particular type of a communication interface.

The developer entity 130 may be operable to create, develop, program, store and/or manage applications, such as, for example, the application 140. The developer entity 130 may be interchangeably referred to as a developer entity, an application developer and/or an application developer entity. The application 140 may comprise, for example, various program(s) and/or application(s) intended to be installed, accessed and/or otherwise operable for use on an electronic device (e.g., the electronic device 110). An application (e.g., the application 140) may comprise, for example, one or more games, business application(s) (e.g., word processing, corporate e-mail access), personal application(s) (e.g., e-mail, web browsing, personal diary), social networking application(s) and other application(s) that may be intended for use on an electronic device (e.g., the electronic device 110).

In an example embodiment of the disclosure, the developer entity 130 may send, to an application server, such as, for example, the application server 120, a request comprising an application (e.g., the application 140) and/or application data for an approval of the application (e.g., the application 140) by the application server 120 for release in an application store. The application store may be supported and/or managed by, for example, the application server 120. In an example embodiment of the disclosure, the application store may be an application store accessible through an electronic device (e.g., the electronic device 110) that may be operable to provide a user of the electronic device with an option to browse, download and/or purchase various applications, such as, for example, the application 140.

The application 140 may comprise data that may be processed by an application server (e.g., the application server 120) and/or by an electronic device (e.g., the electronic device 110) on which the application is intended to be installed, used and/or otherwise interacted with by a user of the electronic device. For example, the application 140 may comprise a software program (e.g., game, personal application, business application, social networking application, etc.) that may be installed on an electronic device (e.g., the electronic device 110), accessed and/or interacted with by a user of the electronic device (e.g., the electronic device 110). The application 140 may comprise data and/or information that may be intended, for example, only for the application server 120, only for the electronic device 110 and/or both for the application server 120 and the electronic device 110. For example, the application 140 may comprise data and/or information intended for the application server 120 that may enable the application server 120 to evaluate the application 140 before the application 140 may be released by the application server 120 to an application store.

The application 140 may be associated with a resource manifest, such as, for example, the resource manifest 141, and/or a file whitelist, such as, for example, the file whitelist 142.

The resource manifest 141 may comprise one or more resource items. A resource item may correspond to a resource and/or a set (e.g., one or more) resources (e.g., camera interface(s), contact list(s), speaker(s), network(s), internal storage, external storage, memory card storage, SD card storage, microphone, GPS, standby prevention, etc.) associated with an electronic device (e.g., the electronic device 110). The resource manifest 141 may be associated with a particular application (e.g., the application 140). A resource manifest may comprise an example resource manifest 141 as depicted in and/or described with respect to FIG. 4.

In an example embodiment of the disclosure, the resource manifest 141 may be implemented as a list (e.g., a text file, XML file, etc.) of resource items. A resource item may be associated with a resource identifier (ID), resource name, and/or other resource data that may allow for an identification and/or access of a particular resource associated with an electronic device (e.g., the electronic device 110) for which the application 140 with which the resource manifest 141 may be associated.

The file whitelist 142 may comprise one or more file items. A file item may comprise a file path and/or one or more file operations associated with the file path.

The file path may comprise one or more characters (e.g., a string) that may be associated with a single file, single file path, one or more file paths that meet a predefined pattern and/or one or more files that meet a predefined patter, etc. The file path may be a full file path (e.g., "/ext/app/," "c:\apps\myapp\), a partial file path (e.g., "~/app/," "\apps\myapp\") and/or a file path pattern. For example, the file path may be expressed, for example, as a file path pattern that may be associated with a single file, for example: "\apps\myapp \mydata.txt". It is to be understood that the "mydata.txt" file that may be located in a file path that meets the file path pattern "\apps\myapp\". In another example, the file path may be expressed, for example, as a file path that may be associated with a single file: "c:\apps\myapp \mydata.txt". It is to be understood that the "mydata.txt" file that may be located in the exact file path "c:\apps\myapp\". The file path may be expressed, for example, as a file path (and/or a file path pattern) that may be associated with one or more files that meet a predefined file pattern (e.g., "*.txt"), for example, a file path "c:\apps\myapp*.txt" (and/or a file path pattern "\apps\myapp*.txt").

A file path may be associated with internal storage, such as, for example, permanent, non-removable and/or integrated storage that may be a part of an electronic device (e.g., the electronic device 110). To simplify and not to limit the present disclosure, a file path associated with internal storage may be expressed as, for example, "\int\." A file path may be associated with external storage, such as, for example, a memory card and/or an SD card. To simplify and not to limit the present disclosure, a file path associated with external storage may be expressed as, for example, "\ext\."

To simplify and not to limit the present disclosure, a file path and/or a file path pattern may be referred to interchangeable without limitation. Also, a file path may comprise a file path pattern. Furthermore, to simplify and not to limit the present disclosure, a file and/or one or more files that meet a predefined file pattern may be referred to interchangeable without imitation. Also, a file may comprise one or more files and/or one or more files that meet a predefined file pattern.

A file operation may comprise a representation (e.g., based on for example, a particular implementation of a file whitelist, a file system, etc.) of a file operation that may be permitted with respect to a particular file path (e.g., file path, file path pattern, file(s), file pattern(s) and/or any combination thereof, etc.).

In an example embodiment of the disclosure, a file whitelist may be implemented as a list (e.g., a text file, XML file, etc.) of, for example, data pairs (e.g., file items) each comprising a file path and one or more file operations. An example data pair (e.g., file item) may be in the following example format: "\app\mydata.txt rd, wr", where "rd" may correspond to a read file operation and "wr" may correspond to a "write" file operation.

The present disclosure is not limited to any particular implementation of a file whitelist and includes any implementation that may allow for specifying a file path (e.g., file path, file path pattern, file(s), file pattern(s) and/or any combination thereof, etc.) and one or more file operations associated with the file path. A file whitelist may comprise an example file whitelist 142 as depicted in and/or described with respect to FIG. 4.

The present disclosure is not limited to a particular implementation of a resource manifest (e.g., the resource manifest 141), resource item(s), a file whitelist (e.g., the file whitelist 142) and/or file item(s). Specifically, the present disclosure is not limited to, for example, an implementation of resource manifest and/or a file whitelist as a list of items, resource or file, respectively. It is to be understood that other implementations that are within the scope of the present disclosure include various implementations that may allow an application server (e.g., the application server 120) and/or an electronic device (e.g., the electronic device 110) to receive and/or process the resource manifest and/or the file whitelist associated with a particular application (e.g., the application 140).

In an example embodiment of the disclosure, the application 140 may be associated with more than one of each of the resource manifest 141 and/or the file whitelist 142. For example, the application 140 may be intended to be used on different types of electronic devices (e.g., a gaming platform, a smartphone, a tablet, etc.) and/or types of operating environments (e.g., an operating system). The application may be associated with one resource manifest and/or file whitelist with respect to one device type (e.g., a smartphone) and/or an operating environment and another resource manifest and/or file whitelist with respect to another device type (e.g., a tablet) and/or an operating environment.

The communication network 150 may comprise any combination of wired and/or wireless protocols, standards and/or interfaces (e.g. Ethernet, Bluetooth, WiFi, satellite and/or cellular network, WiMAX, WLAN, NFC, etc.) that enable communication between electronic devices (e.g., the electronic device 110), servers (e.g., the application server 120) and/or other computing devices and/or entities (e.g., the developer entity 130).

The communication network 150 may support communication on one or more communication links, such as, for example, the communication links 151, 152 and/or 153. Although the communication links 151, 152 and/or 153 are illustrated as separate communication links, the disclosure is not limited in this way. Specifically, the communication links 151, 152 and/or 153 may together comprise one or more communication links and/or may each separately comprise one or more communication links. Although the communication links 151, 152 and/or 153 may appear in FIG. 1 to be associated with a particular device, server and/or entity, the disclosure is not limited in this way. Specifically, the communication of various devices, servers and/or entities (e.g., the electronic device 110, the application server 120, the developer entity 130) with each other (e.g., directly and/or on the communication network 150), on and/or with the communication network 150 does not need to occur on a particular communication link (e.g., the communication link 151, 152 and/or 153). It is to be understood that the communication network 150, the communication links 151, 152 and/or 153 have been used for illustration purposes only and do not limit the present disclosure to any particular implementation of a communication network and/or communication links that may allow for communication between various devices, servers and/or entities consistent with the present disclosure.

Referring to FIG. 1, there is shown a plurality of actions, a submit action 101, an approve 102, a release 103, a download action 104 and/or a control access action 105. The submit action 101 may be performed by the developer entity 130. The approve action 102 and/or the release action 103 may be performed by the application server 120. The download action 104 and/or the control access action 105 may be performed by the electronic device 110.

In operation, a developer entity, such as, for example, the developer entity 130, may perform a submit action (e.g., the submit action 101). In this regard, the developer entity 130 may send, to an application server, such as, for example, the application server 120, a request to approve an application (e.g., the application 140) for release of the application in an application store. The request may comprise an application (e.g., the application 140), a representation of an application (e.g., executable instructions and/or code that may make the application operable on an electronic device) and/or application data. The application data may, for example, comprise a resource manifest (e.g., the resource manifest 141) and/or a file whitelist (e.g., the file whitelist 142) associated with the application (e.g., the application 140). The application data may also comprise other developer and/or application related data (e.g., developer name, developer identifier, application version, application category, application executable instructions, etc.).

In operation, an application server, such as, for example, the application server 120 may perform an approval action (e.g., the approval action 102). The approval action may be performed in response to a submit action (e.g., the submit action 101) that may have been performed at an earlier time by a developer entity, such as, for example, the developer entity 130. The approval action may not immediately follow a submit action. In an example embodiment of the disclosure, the application server 120 may have received one or more applications for approval for release in an application store from one or more developer entities (e.g., developer entity 130). The application server 120 may perform an approval action with respect to all or some of the one or more applications at the same time or at different times.

During an approval action, the application server 120 may, for example, determine whether an application (e.g., the application 140) may be approved for release in an application store. In this regard, the application server 120 may analyze the application and/or the application data that may have been received from a developer entity (e.g., the developer entity 130) during, for example, a submit action (e.g., the submit action 101). The analysis may be based on, for example, a resource manifest and/or a file whitelist associated with the application, where the resource manifest and the file whitelist may have been received as part of, for example, the application data.

In an example embodiment of the disclosure, the application server 120 may analyze the resource manifest (e.g., the resource manifest 141) to determine whether resource items associated with the resource manifest are, for example, necessary and/or reasonable with respect to resources of an electronic device (e.g., the electronic device 110) to which an access may be requested during an operation and/or execution of the application. For example, a social networking application may be associated with a resource manifest that, for example, includes resource items corresponding to the following example resources of an electronic device: network, camera interface, contact list, system settings, external storage, etc. The application server 120 may determine that, for example, an access to the network, camera interface and/or external storage resources may be necessary and/or reasonable and/or that an access to the contact list and/or the system setting resources may not be necessary and/or reasonable for the example social networking application.

In an example embodiment of the disclosure, the application server 120 may analyze the file whitelist (e.g., the file whitelist 142) to determine whether file items associated with the file whitelist are, for example, necessary and/or reasonable with respect to one or more files and/or file paths to which an access may be requested during an operation and/or execution of the application. For example, a social networking application may be associated with a file whitelist that, for example, includes file items corresponding to the following example files and/or file paths: "\ext\photos\" (e.g., associated with photo images on an external storage) associated with a "read" file operation, "\app\mydata\" (e.g., associated with the particular application's data on, for example internal or external storage) associated with a "read" and a "write" file operation, "\int\system\" (e.g., associated with system files and setting on internal storage) associated with a "read" and a "write" file operation, "\int\system\settings\myapp\" (e.g., associated with system files and setting corresponding to the particular application) associated with a "read" and a "write" file operation, etc. The application server 120 may determine that, for example, an access to the files and/or file paths "\ext\photos\" (e.g., because the application requested only "read" file operation with respect to the files and/or file paths and not, for example, a "write" file operation), "\ext\app\mydata\" (e.g., because the files and/or file paths are associated with the application and not with, for example, other application(s)), "\int\system\settings\myapp\" (e.g., because the files and/or file paths are associated with the application and not with, for example, other application(s)), may be necessary and/or reasonable and/or that an access to the files and/or file paths "\int\system\" (e.g., because the files and/or file paths are associated with system files and settings) not be necessary and/or reasonable for the example social networking application.

The determination of whether an access by an application to a particular resource, files and/or file paths may be necessary and/or reasonable may be based on a variety of criteria, such as, for example, the type of the application, the developer entity with which the application is associated, the type of a resource, files and/or file paths to which access is requested, etc.

In an example embodiment of the disclosure, the application server 120 may not approve an application which may be associated with a resource manifest, where one or more resource items associated with the resource manifest correspond to a resource of an electronic device to which access by the application may not be necessary and/or reasonable. For example, the application server 120 may not approve the example social networking application because, for example, access to the contact list and/or the system settings resources of an electronic device may not be necessary and/or reasonable for the example social networking application.

In an example embodiment of the disclosure, the application server 120 may not approve an application which may be associated with a file whitelist, where one or more file items associated with the file whitelist correspond to one or more files and/or file paths to which access by the application may not be necessary and/or reasonable. For example, the application server 120 may not approve the example social networking application because, for example, access to the files and/or file paths "\int\system\" may not be necessary and/or reasonable for the example social networking application.

In an example embodiment of the disclosure, the application server 120 may approve an application with a modified resource manifest. In this regard, even though the application may be associated with a resource manifest, where one or more resource items ("disapproved resource items") associated with the resource manifest correspond to a resource of an electronic device to which access by the application may not be necessary and/or reasonable, the application server 120 may modify the resource manifest and may remove the disapproved resource items associated with the resource manifest. For example, the application server 120 may approve the example social networking application with a modified resource manifest, where the modified resource manifest may not include the resource items corresponding to the contact list and/or system settings resources.

In an example embodiment of the disclosure, the application server 120 may approve an application with a modified file whitelist. In this regard, even though the application may be associated with a file whitelist, where one or more file items ("disapproved file items") associated with the file whitelist correspond to a file and/or file path to which access (e.g., including the associated file operations) by the application may not be necessary and/or reasonable, the application server 120 may modify the file whitelist and may remove the disapproved file items associated with the file whitelist. For example, the application server 120 may approve the example social networking application with a modified file whitelist, where the modified file whitelist may not include the file item corresponding to the file(s) and/or file path(s) "\int\system\" and including the "read" and "write" file operations.

In an example embodiment of the disclosure, the application server 120 may modify a file whitelist by, for example, removing a file item from the file whitelist and/or modifying a file item on the file whitelist. A modification of a file item may comprise a modification to a file path and/or one or more file operations associated with the file path. For example, the application server 120 may modify a particular file item by modifying (e.g., removing, adding) the one or more file operations associated with the particular file item. For example, the application server 120 may remove/delete a "write" file operation and/or it may retain the "read" file operation with respect to the file path associated with the particular file item.

In an example embodiment of the disclosure, during an approval action, the application server 120 may communicate application receipt data to the developer entity 130 associated with that application 140. In this regard, the application receipt data may comprise data and/or information indicative of whether the application 140 was approved for release in an application store.

In an example embodiment of the disclosure, the application server 120 may approve an application with a modified resource manifest and/or file whitelist, as previously described, automatically and/or conditionally. For example, in an automatic approval, the application server 120 may approve an application with a modified resource manifest and/or file whitelist based on, for example, only a submit action (e.g., the submit action 101). For example, in a conditional approval, the application server 120 may communicate to a developer entity (e.g., the developer entity 130) data and/or information indicating that the application may be approved for release in an application store if the developer entity approves the modified resource manifest and/or the modified file whitelist. The data and/or information may be a part of an application receipt data.

In an example embodiment of the disclosure, when an application (e.g. application 140) was not approved (and/or was conditionally approved) for release in an application store, the application receipt data may comprise data and/or information indicative of, for example, one or more reasons for denial to release the application 140 in an application store. For example, the one or more reasons for denial may be related to a resource manifest (e.g., resource manifest 141) and/or file whitelist (e.g. file whitelist 142) associated with the application 140.

In an example embodiment of the disclosure, the application receipt data may comprise, for example, an option (and/or instructions) to automatically and/or manually modify a resource manifest (e.g., the resource manifest 141) and/or a file whitelist (e.g., the file whitelist 142) associated with the application 140, such that, the application 140 may be in a condition for approval for release in an application store as a result of the modification(s). The option may be associated with the conditional approval as previously described (e.g., an approval of an application with a modified resource manifest and/or a modified file whitelist).

In an example embodiment of the disclosure, an example automatic option to modify a resource manifest (e.g., the resource manifest 141) and/or a file whitelist (e.g., the file whitelist 142) associated with the application 140 may be associated with, for example, providing an automated method for the developer entity 130 to send to the application server 120 a request to automatically modify the resource manifest and/or the file whitelist based on, for example, modifications proposed by the application server 120 that may have been communicated to the developer entity 130 along with, for example, the application receipt data. For example, the application server 120 may communicate to the developer entity 130 a message including, for example, a hyperlink and/or any other method that may allow the developer entity 130 associated with the application 140 to send a request to the application server 120 to automatically modify the resource manifest and/or the file whitelist.

In an example embodiment of the disclosure the message may be an e-mail message. The e-mail message may comprise, for example, a representation of a proposed resource manifest modification and/or a proposed file whitelist modification that may bring the application 140 into a condition for allowance for release in the application store. The e-mail message may provide an option to the developer entity 130 to respond to the proposed resource manifest and/or the proposed file whitelist modification. In an example embodiment of the disclosure, the option may be an option to automatically modify the resource manifest and/or the file whitelist by replacing the resource manifest and/or the file whitelist with the proposed resource manifest and/or the proposed file whitelist, respectively, and/or by accepting modifications to the resource manifest and/or the file whitelist.

The option may be in a form of, for example, a hyperlink, a shortcut and any other method that would facilitate an automated (e.g., without custom user input) communication between the developer entity 130 and the application server 120. For example, if the option is in a form of a hyperlink, the developer entity 130 may process the hyper link (e.g., automatically though an API that may allow communication between the developer entity 130 and the application server 120, manually though a user interaction—selecting and/or interacting with the hyperlink, etc.). The processing of the hyperlink may cause the developer entity 130 to send, to the application server 120, a message, such as, for example, an automatically generated e-mail and/or any other communication that may be received and/or processed by the application server 120.

In another example embodiment of the disclosure, the option may be in a form of a text communication. For example, the text communication may direct the developer entity 130 to, for example, log into a developer account associated with the developer entity 130. It is to be understood that the text communication may also include, for example, an option to automatically log into the developer account by, for example, opening a developer interface (e.g., a web browser interface, etc.) and/or re-directing to a developer interface that may provide an option, for the developer entity 130, to respond to the proposed modifications to the resource manifest and/or the file whitelist.

In operation, an application server, such as, for example, the application server 120 may perform a release action (e.g., the release action 103). The release action may be performed in response to an approval action (e.g., the approval action 102) that may have been performed at an earlier time by the application server 120.

During a release action, the application server 120 may release an application (e.g., the application 140) to an application store. The application may be released to an application store if, for example, the application was approved for release during an approval action (e.g., the approval action 102).

In an example embodiment of the disclosure, during a release action, the application server 120 may send application receipt data to the developer entity 130 associated with that application 140. In this regard, the application receipt data may comprise data and/or information indicative of whether (and/or when) the application 140 may be released in an application store.

In operation, an electronic device, such as, for example, the electronic device 110, may perform a download action (e.g., the download action 104). The download action may be performed in response to, for example, a request by the electronic device (e.g., through user input) to, for example, download and/or purchase an application (e.g., the application 140). The download action may be performed with respect to one or more applications (e.g., the application 140) that may be available in an application store (e.g., an application store managed and/or supported by an application server, such as, for example, the application server 120) and/or suitable for consumption of the electronic device (e.g., supported by the electronic device, the electronic device's operating system, etc.).

In an example embodiment of the disclosure, when an application (e.g., the application 140) is downloaded to an electronic device, the application may be downloaded with an associated resource manifest (e.g., the resource manifest 141) and/or an associated file whitelist (e.g., the file whitelist 142).

In an example embodiment of the disclosure, the contents (e.g., items) of a resource manifest (e.g., the resource manifest 141) and/or a file whitelist (e.g., the file whitelist 142) associated with an application (e.g., the application 140) that, for example, is intended to be downloaded to an electronic device (e.g., the electronic device 110), may be revealed to a user of the electronic device, for example before and/or after the application is purchased and/or downloaded. In an example embodiment of the disclosure, the contents may be available for review to the user when the user requests the review (e.g., though an interface associated with an application store and/or a graphical user interface (GUI) that may allow the user to review the application, change the applications settings, etc.)

In an example embodiment of the disclosure, a user of an electronic device (e.g., the electronic device 110) may have a full and/or limited control over resource manifest (e.g., the resource manifest 141) and/or a file whitelist (e.g., the file whitelist 142) associated with an application (e.g., the application 140) installed on (e.g., downloaded to the electronic device). For example, the user may be able to modify the contents (e.g., items) of the resource manifest and/or the file whitelist after an application was downloaded (e.g., the download action 104) to the electronic device.

In an example embodiment of the disclosure, the user may be able to, for example, toggle (e.g., enable/disable, allow/disallow, turn on/off, etc.) access by an application (e.g., the application 140) to a particular resource (e.g., an item associated with the resource manifest) and/or a particular file and/or file path (e.g., an item associated with the file whitelist). A user may be able to toggle access at various times, such as, for example, when an application is downloaded to the electronic device (e.g., the download action 104), when the application request access to a particular recourse, file and/or file path (e.g., a user may be presented with a prompt to allow and/or deny access) and/or at any other time (e.g., by accessing settings associated with the application). The toggle action may provide a user with a customized access approval process to resources, filed and/or file path that may have been previously evaluated and/or approved by an application server (e.g., the application server 120) during, for example an application approve (e.g., the approve action 102) and release (e.g., the release action 103) process.

In an example embodiment of the disclosure, the user may be able to, for example, toggle access permissions to a particular file item and/or toggle file operation permissions associated with a file path of the particular file item. For example, a user may turn off access to a particular file item, including any file operations associated with the file path of the file time. In another example, a user may turn off "write" file operation (e.g., and keep "read" file operation turned on) for the file path associated with the particular file item.

In operation, an electronic device, such as, for example, the electronic device 110, may perform a control access action (e.g., the control access 105). The control access action may be performed in response to, for example, a request by an application (e.g., the application 140) running and/or executing on an electronic device, to access a particular resource on the electronic device, a particular file and/or file path.

For example, the control access action may be performed when an application requests access to a particular resource of an electronic device, such as, for example, external storage. During the control access action, the electronic device may detect that an application requested access to the external storage. The electronic device may determine whether the application may be granted access to the external storage by analyzing a resource manifest associated with the application. For example, if one of the resource items of the resource manifest corresponds to the external storage, the electronic device may grant the application access to the external storage.

In an example embodiment of the disclosure, when an application requests access to the external storage (and, for example, is granted such access based on a resource manifest), the electronic device may determine to what particular file and/or file path the application requests access. For example, the application may request to access an example file and/or file path resource "\ext\app\mydata\". In this regard, the electronic device may analyze a file whitelist to determine whether the particular file and/or file path corresponds to one or more file items. Specifically, the electronic device may determine whether the example file and/or file path resource "\ext\app\mydata\" corresponds to a particular file path of a particular file item. The electronic device may also analyze the determined particular file item to determine whether the particular access action (e.g., read, write, etc.) corresponds to a file operation associated with the file path of the particular file item. If the example file and/or file path resource "\ext\app\mydata\" correspond to a file path of a particular file item and the requested access action corresponds to a file operation of the particular file item, access to the example file and/or file path resource "\ext\app\mydata\" may be granted. Otherwise, the access to example file and/or file path resource "\ext\app\mydata\" may be denied (e.g., even if the application may have been granted access to the external storage based on the resource manifest associated with the application).

In an example embodiment of the disclosure, a malicious application (e.g., an application intended to compromise security of an electronic device and/or data, including personal user data) may be prevented from compromising security of an electronic device on which it is installed (e.g., to which it is downloaded and/or on which it executes) and/or of sensitive data and/or personal user data (e.g., e-mail account information, passwords, contact list, etc.). In this regard, when a malicious application (e.g., the application 140) is submitted (e.g., the submit action 101) by a developer entity (e.g., the developer entity 130) to an application server (e.g., the application server 120) for an approval for release in an application store, the application may have to be associated with a resource manifest (e.g., the resource manifest 141) and/or a file whitelist (the file whitelist 142). During an approval process (e.g., the approval action 102), the application server may determine that the application submitted for approval is malicious based on the content (e.g., items) of the resource manifest and/or the file whitelist. The application server may not approve the application for release in an application store based on the determination that the application is malicious.

In an example embodiment of the discourse, a well-intentioned application (e.g., a non-malicious application) may be compromised after it has already been approved for release (e.g., the approve action 102) and/or released (e.g., the release action 103) to an application store. For example, a well-intentioned application may be downloaded (e.g., the download action) to an electronic device (e.g., the electronic device 110). The well-intentioned application may be compromised by, for example, another application, a code bug in the well-intentioned application and/or another application, etc. In this regard, when the compromised well-intentioned application requests access to a malicious file and/or file path (e.g., due to malicious activity affecting the application), the electronic device may not approve access to the malicious file and/or file path. Specifically, when the well-intentioned application was approved for release and/or released to an application store it may have been associated with a resource manifest (e.g., the resource manifest 141) and/or a file whitelist (the file whitelist 142). Because the application was well-intentioned, the file whitelist may not include a file item corresponding to the malicious file and/or file path. The electronic device during, for example, an access control action (e.g. the access control action 105) may determine that the malicious file and/or file path does not correspond to any file items associated with the file whitelist and may not approve the application to access the malicious file and/or file path.

In an example embodiment of the disclosure, a well-intentioned application (as previously described) may be compromised by accessing an approved file and/or file path (e.g., a particular file and/or file path that may correspond to a file item on the file whitelist associated with the well-intentioned application) where the approved file and/or file path may have been compromised itself by, for example, a malicious attack on an application associated with the approved file and/or file path. For example, an access to a particular approved file and/or file path may result in a re-direct (e.g., via a symbolic link) to a malicious file and/or file path.

In this regard, the electronic application may approve the well-intentioned application's request to access the particular file and/or file path (e.g., where the particular file and/or file path corresponds to a file path of one or more file items associated with a file whitelist associated with the well-intentioned application). The electronic device may monitor the well-intentioned application's access to the particular file and/or file path (e.g., "\ext\app\mydata\"). In this regard, the electronic device may determine that, for example, an access to the particular file and/or file path (e.g., "\ext\app\mydata\") resulted in a re-direct from the particular file and/or file path (e.g., "\ext\app\mydata\") to a malicious file and/or file path (e.g., "\int\system\"), for example, because the particular file an/or file path (and/or the application) was compromised. The electronic device may prevent the well-intentioned application's access to the malicious file and/or file path by, for example, not approving the well-intentioned application's access to the particular file and/or file path that may correspond to one or more approved file items (e.g., file items associated with the file whitelist associated with the well-intentioned application).

In an example embodiment of the disclosure, the electronic device 110 may, for example, determine that the malicious file and/or file path (e.g., "\int\system\") corresponds to internal storage resource based on the "\int\" contained in the malicious file and/or file path. Access to the internal storage may not be granted if the internal storage does not correspond to any resource items on a resource manifest associated with the well-intentioned application. Furthermore, even if, internal storage does correspond to at least one item on the resource manifest associated with the well-intentioned application, access to internal storage (e.g. a specific access action, such as, for example, read or write file operation, etc.) may be denied, because, for example the malicious file and/or folder path does not correspond to any file items on a file whitelist associated with the well-intentioned application. Also, even if the malicious file and/or file path does correspond to at least one file item on a file whitelist associated with the well-intentioned application (e.g., because the file whitelist was compromised ( ), access to the malicious file and/or file path (e.g., "\int\system\") may be denied. In this regard, the electronic device 110 may determine that a file operation associated with accessing the malicious file and/or file path (e.g., "\int\system\") does not correspond to any file operation of a file item in the file whitelist.

In an example embodiment of the disclosure 110, the electronic device may prevent read and/or write access to a file whitelist (and/or resource manifest) in order to prevent malicious activity. Furthermore, even if, a malicious activity results in a modification of a file whitelist (and/or resource manifest), the electronic device 110 may request from an application server (e.g., the application server 120) an updated (and/or current) file whitelist (and/or resource manifest) associated with the particular application. For example, such a request may be periodic (e.g., performed on a lapse of a predetermined amount of time from last request, on an occurrence of a predefined condition, etc.). In another example, such a request may be triggered when, for example, the electronic device 110 detects a re-direct request.

In an example embodiment of the disclosure, an electronic device (e.g., the electronic device 110) may monitor resource(s) of the electronic device to determine whether a particular application (e.g., application 140) requested access to a particular resource. For example, the electronic device may monitor resource(s) of the electronic device and may detect that a particular application is attempting to access a particular resource. In this regard, the electronic application may grant access to the particular resource (e.g., if the particular resource corresponds to a resource item associated with a resource manifest (e.g., the resource manifest 141) associated with the application).

In an example embodiment of the disclosure, the electronic device (e.g., the electronic device 110) may monitor a resource of the electronic device associated with, for example, storage (e.g., internal, external, etc.) to determine whether a particular application (e.g., application 140) requested access storage. If the particular application requested access to storage, the electronic device may monitor the particular application (and/or storage) to determine whether the application requested access to a particular file and/or file path. For example, the electronic device may detect that a particular application is attempting to access a particular file and/or file path. In this regard, the electronic application may grant access to the particular file and/or file path (e.g., if the particular file and/or file path corresponds to a particular file item associated with a file whitelist (e.g., the file whitelist 142) associated with the application and the requested access action (e.g., read file operation, write file operation, etc.) corresponds to a file operation associated with the particular file item).

In an example embodiment of the disclosure, an electronic device (e.g., the electronic device 110) may monitor applications on the electronic device to determine whether a particular application (e.g., application 140) requested access to a particular resource, file and/or file path. The monitoring may be ongoing and/or continuous (e.g., monitoring of some or all active application) and/or may occur at pre-defined time intervals and/or on an occurrence of a pre-defined condition (e.g., a lunch and/or execution of an application, a request to access a particular resource, etc.). In this regard, the electronic application may grant access to the particular resource (e.g., if the particular resource corresponds to a resource item associated with a resource manifest (e.g., the resource manifest 141) associated with the application) and/or file and/or file path (e.g., if the particular file and/or file path corresponds to a particular file item associated with a file whitelist (e.g., the file whitelist 142) associated with the application and the requested access action (e.g., read file operation, write file operation, etc.) corresponds to a file operation associated with the particular file item).

In an example embodiment of the disclosure, a request by an application (e.g., the application 140) to access a particular resource, file and/or a file path may be generated by the application and/or may occur in response and/or as a consequence of the application execution of a particular function. For example, an application may request access to a particular resource, file and/or a file path before it accesses the particular resource, file and/or a file path and/or at the time of accessing (e.g., attempting to access) the particular resource, file and/or a file path. In another example embodiment of the disclosure, the application may initiate execution of a function, which, for example, may in turn require access to a particular resource, file and/or a file path. In another example embodiment of the disclosure, the application may call a system function (e.g., associated with, for example, an operating system of the electronic device) that may be associated with a particular resource, file and/or a file path. The disclosure is not limited to any particular implementation of accessing a resource, file and/or a file path, and/or requesting access to a particular resource, file and/or a file path, etc.

In an example embodiment of the discourse, an electronic device (e.g., the electronic device) may communicate with an application server (e.g., the application server 120) and/or a developer entity (e.g., the developer entity 130) associated with an application that may have been compromised to notify the application server and/or the developer entity of the suspicious (e.g., malicious, etc.) activity by the application.

The application server may (e.g., the application server 120), in response to the communication about the suspicious activity (and/or a pre-determined number of communications regarding the same application), communicate with the developer entity (e.g., the developer entity 130) associated with the application to notify the developer entity that, for example, the application may have been compromised (e.g., due to a bug in application code, due to an attack on the application, etc.).

In an example embodiment of the disclosure, the application server 120 may provide and/or manage developer registration services. A developer entity, such as, for example the developer entity 130 may register with the registration/authentication services provided by the application server 120, by for example creating a developer account. The registration services may provide, for example, for a graphical user interface (GUI), where a user associated with the developer entity 110 may initiate a registration process for the developer entity 130.

In an example embodiment of the disclosure, the application server 120 may provide and/or manage developer authentication services. For example, during an application approval process, the application server 120 may provide a prompt to a user associated with the developer entity 130 for authentication data and/or information. The developer entity 130 (e.g., in response to user input and/or a predefined criteria) may send the authentication data and/or information to the application server 120 for authenticating the developer entity 130.

In an example embodiment of the disclosure, the application server 120 may automatically authenticate the developer entity 130 when, for example the developer entity 130 itself (e.g., without a user's intervention) or through a user associated with the developer entity 130, sends a request to the application server 120 for the application server 120 to approve an application for releasing in an application store. In this regard, when the application server 120 receives the request, the application server 120 may verify the identity of the developer entity 130. For example, the application server 120 may initiate and/or perform a search on a developer database to determine whether the developer entity 130 corresponds to a particular developer entity and authenticate the particular developer entity based on the correspondence.

Although actions 101, 102, 103, 104 and/or 105 may have been illustrated in sequence, the present disclosure is not limited in this way. For example, an application may be submitted (e.g. the submit action 101) by a developer entity to an application server and the application server may not immediately respond to the submit action, with, for example, an approval action (e.g., the approval action 102.) For example, the application server may proceed with approving (or disapproving) applications from release in an application store based on the submit actions, in sequence (e.g., first in, first out, etc.) and/or based on application priority (e.g., an application associate with, for example, a particular category, particular developer entity, etc., may have priority over another application associated with a different category and/or a different developer, etc.).

Although FIG. 1 shows a particular sequence of actions (e.g., the action 101, 102, 103, 104, 105), the present disclosure is not limited to a particular sequence of the actions. Furthermore, the present disclosure is not limited to performing all actions in the example sequence. For example, each action may be performed independently. It is to be understood that the description of the actions and the sequence of the actions in the present disclosure has been chosen to simplify and not to limit the disclosure. Specifically, it is to be understood that a particular application may be subject to one or more actions by, for example, a developer entity (e.g., the developer entity 130) and/or an application server (e.g., the application server 120) before, for example, it may be available for consumption (e.g., purchase, download, etc.) on an electronic device (e.g., the electronic device 110). It is to be further understood that the control of resource access (e.g., the action 105) may be performed one or more times by an electronic device (e.g., the electronic device 110) with respect to one or more applications (e.g., the application 140).

In situations in which an example embodiment of the disclosure may collect personal information about users (e.g., users of electronic devices), or may make use of personal information, the users may be provided with an opportunity to control whether programs, applications, functions and/or features collect user related information (e.g., information about a user's social network, social actions or activities, profession, a user's preferences, a user's current location, etc.), and/or to control whether and/or how to receive applications supporting using a file whitelist from an application server (e.g., application server 120).

In addition, certain data may be treated in one or more ways before it is stored and/or used, so that personally identifiable information is removed. For example, a user's identity may be treated so that no personally identifiable information can be determined for the user, or a user's geographic location may be generalized where location information is obtained (e.g., such as to a city, ZIP code, or state level), so that a particular location of a user cannot be determined. Thus, the user may have control over how information is collected about the user and used by, for example, an application server (e.g., application server 120).

Figure 2:
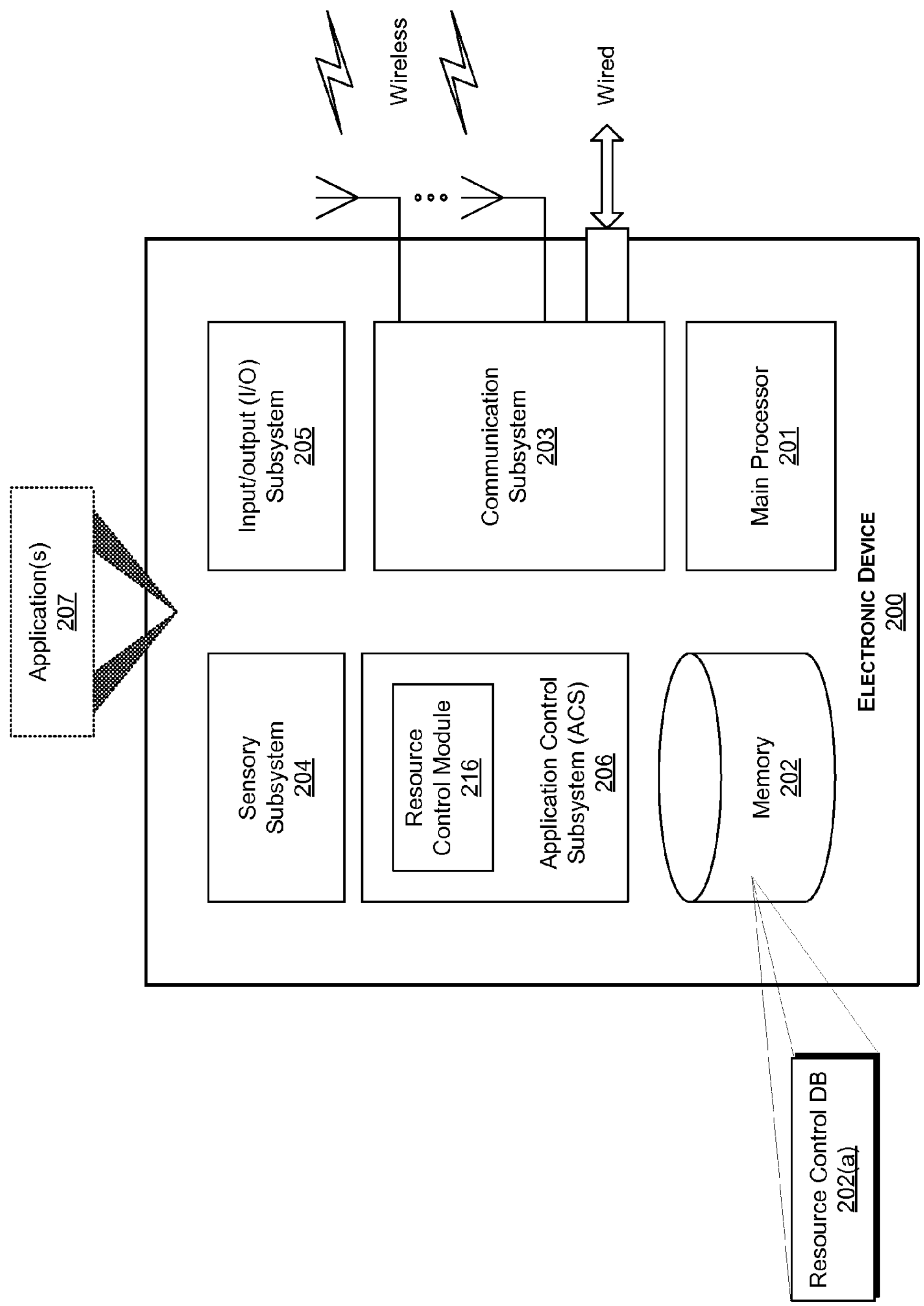
FIG. 2 is a block diagram of an example electronic device that supports using a file whitelist, in accordance with an example embodiment of the disclosure.

FIG. 2 is a block diagram of example electronic device that supports using a file whitelist, in accordance with an example embodiment of the disclosure. Referring to FIG. 2, there is shown an electronic device 200.

The electronic device 200 may comprise suitable logic, circuitry, interfaces, and/or code that may be operable to implement various aspects of the disclosure. In this regard, the electronic device 200 may correspond to the electronic device 110, as depicted in and/or described with respect to FIG. 1. The electronic device 200 may comprise, for example, a main processor 201, a memory 202, a communication subsystem 203, a sensory subsystem 204, an input/output (I/O) subsystem 205 and/or an application control subsystem (ACS) 206.

The main processor 201 may comprise suitable logic, circuitry, interfaces, and/or code that may be operable to process data, and/or control and/or manage operations of the electronic device 200, and/or tasks and/or applications performed therein. In this regard, the main processor 201 may be operable to configure, manage and/or control operations of various components and/or subsystems of the electronic device 200, such as, for example, the memory 202, the communication subsystem 203, the sensory subsystem 204, the I/O subsystem 205 and/or the ACS 206, by utilizing, for example, one or more control signals. The main processor 201 may enable running and/or executing applications, programs and/or code, which may be stored, for example, in the memory 202. Alternatively, one or more dedicated application processors may be utilized for running and/or executing applications, programs and/or code in the electronic device 200. In some instances, the applications running and/or executing on the electronic device 200 may comprise one or more application(s) 207, which may support using a file whitelist. Some or all of the one or more application(s) 207 may correspond to the application 140 as depicted in and/or described with respect to FIG. 1.

The memory 202 may comprise suitable logic, circuitry, interfaces, and/or code that that may be operable to enable permanent and/or non-permanent storage, buffering, and/or fetching of data, code and/or other information, which may be used, consumed, and/or processed by the components of the electronic device 200. In this regard, the memory 202 may be enabled to store executable instructions to manage and/or configure, for example, the main processor 201, the communication subsystem 203, the sensory subsystem 204, the input/output (I/O) subsystem 205 and/or the ACS 206. The memory 202 may store, for example, configuration data, which may comprise parameters and/or code, comprising software and/or firmware. The memory 202 may comprise different memory technologies, including, for example, read-only memory (ROM), random access memory (RAM), low latency nonvolatile memory, flash memory, solid-state drive (SSD), field-programmable gate array (FPGA), and/or other suitable electronic data storage capable of storing data, code and/or other information. The memory 202 may comprise internal storage (e.g., permanent, non-removable and/or integrated storage) and/or external storage (e.g., a memory card, an SD card, etc.)

The memory 202 may comprise a resource control database, such as, for example, the resource control database 202(*a*). The resource control database 202(*a*) may comprise a plurality of database objects each corresponding to a particular resource and/or application.

In an example embodiment of the disclosure, the resource control database 202(*a*) may store, process and/or manage access permissions to resources and/or storage resources on a per resource basis. For example, the resource database 202(*a*) may store, process and/or manage a representation of resources of the electronic device 200 and may for one or more of the resources store, process and/or manage a representation of an application (e.g., application(s) 207) that may be allowed access to the one or more resources (e.g., a representation of a resource manifest associated with an application).

In an example embodiment of the disclosure, the resource control database 202(*a*) may store, process and/or manage access permissions to resources and/or storage resources on a per application basis. For example, the resource database 202(*a*) may store, process and/or manage a representation of application(s) (e.g., applications(s) 207) and/or application(s) data (e.g., application name, application type (e.g., game, business application, personal application, social networking application, etc.), a developer entity associated with the application, a resource manifest, a file whitelist) and may for one or more of the application(s) store, process and/or manage a representation of one or more resources that the application(s) may be allowed to access (e.g., based on a resource manifest associated with the application(s)).

In an example embodiment of the disclosure, the resource control database 202(*a*) may store, process and/or manage representation of file whitelist(s) associated with application(s) (e.g., application(s) 207).

The disclosure is not limited to a particular implementation of the resource control database 202(*a*). Furthermore, it is to be understood that the permissions to access particular resources and/or storage resources (e.g., file(s) and/or file path(s)) (e.g., associated with a resource manifest and/or a file whitelist, respectively) do not need to be stored, processed and/or managed by a database (e.g., the resource control database 202(*a*)), but may be implemented otherwise. For example, the permission to access particular resources and/or storage resources (e.g., file(s) and/or file path(s)) may be implemented as part of the application code, software, application programming interface (API), operating system and/or platform of the electronic device 200, etc.

The communication subsystem 203 may comprise suitable logic, circuitry, interfaces, and/or code that may be operable to communicate data from and/or to the electronic device 200, such as via one or more wired and/or wireless connections. For example, the communication subsystem 203 may comprise one or more transceivers for providing wired and/or wireless communication of data. The communication subsystem 203 may be configured to support one or more wired and/or wireless protocols, standards and/or interfaces (e.g., Ethernet, Bluetooth, WiFi, satellite and/or cellular network, WiMAX, WLAN, NFC, etc.) facilitating transmission and/or reception of signals to and/or from the electronic device 200, and/or processing of transmitted or received signals in accordance with applicable wired or wireless protocols. In this regard, signal-processing operations may comprise filtering, amplification, analog-to-digital conversion and/or digital-to-analog conversion, up-conversion/down-conversion of base-band signals, encoding/decoding, encryption/decryption, and/or modulation/demodulation.

The sensory subsystem 204 may comprise suitable logic, circuitry, interfaces, and/or code that may be operable to obtain and/or generate sensory information, which may relate to the electronic device 200, its user(s), and/or its environment. For example, the sensory subsystem 204 may comprise positional or locational sensors (e.g., GPS, GNSS, WiFi, BT, BTL, BTLE sensors, etc.), ambient condition sensors (e.g., temperature, humidity, or light), and/or motion related sensors (e.g., accelerometer, gyroscope, pedometers, and/or altimeters).

The I/O subsystem 205 may comprise suitable logic, circuitry, interfaces, and/or code that may be operable to enable user interactions with the electronic device 200, obtain input from user(s) of the electronic device 200 and/or provide output to the user(s). The I/O subsystem 205 may support various types of inputs and/or outputs, including, for example, video, audio, and/or textual. In this regard, dedicated I/O devices and/or components, external to or integrated within the electronic device 200, may be utilized for inputting and/or outputting data during operations of the I/O subsystem 205. Example (external or integrated) I/O devices may comprise displays, mice, keyboards, touchscreens, voice input interfaces, vibration mechanism, still image and/or video capturing devices and/or other input/output interfaces and/or devices.

The ACS 206 may comprise suitable logic, circuitry, interfaces, and/or code that may be operable to control access to resource(s) of the electronic device 200 and/or storage resource(s) (e.g., file(s) and/or file path(s)) by application(s) running and/or executing on the electronic device 200, such as, for example the application(s) 207. Some or all of the application(s) 207 may correspond to the application 140 as depicted in and/or described with respect to FIG. 1 and/or FIG. 4. The ACS 206 may be operable to manage application(s) (e.g., the application(s) 207) and/or data and/or information related to application(s). The ACS 206 may comprise a resource control module, such as, for example, the resource control module (RCM) 216. The ACS 206 maybe part of the operating system if present.

The RCM 216 may be operable to initiate, receive, process and/or manage a request, from an application, for the application to access a particular resource and/or a storage resource (e.g., file and/or file path). In this regard, the RCM 216 may be operable to analyze the request and to determine whether and/or when to grant and/or deny access to a particular resource and/or a storage resource (e.g., file and/or file path) by the application.

In an example embodiment of the disclosure, the ACS 206 may monitor and/or analyze various applications (e.g., the application(s) 207) and/or processes running on the electronic device 200 to determine whether, for example, one or more application(s) requested access to a particular resource and/or storage resource (e.g., file and/or file path).

In an example embodiment of the disclosure, the ACS 206 may be operable to collect, analyze, process and/or manage data and/or information related to performance of various application(s) (e.g., the application(s) 207) running and/or executing on the electronic device 200. In this regard, the ACS 206 may collect, analyze, process and/or manage data related to, for example, whether application(s) request access to resources and/or storage resource (e.g., file and/or file path) that may not be associated with items on a resource manifest and/or a file whitelist associated with the application(s). For example, the ACS 206 may be operable to detect whether application(s) perform maliciously and may be operable to collect, analyze, process and/or manage data related to the malicious activity by the application(s).

In an example embodiment of the disclosure, the ACS 206 may communicate, to an application server (e.g., the application server 120 as depicted in and/or described with respect to FIG. 1) and/or a developer entity (e.g., the developer entity 130 as depicted in and/or described with respect to FIG. 1) associated with an application, data and/or information about malicious activity by the application.

In an example embodiment of the discourse, the electronic device 200 may be operable to run, process and/or manage software, functions and/or services associated with a platform that the electronic device 200 may be operating under (e.g., a platform associated with an operating system (OS)). In an example embodiment of the discourse, the electronic device 200 may be operable to run, process and/or manage software associated with application programming interfaces (APIs), external services (e.g., cloud storage), etc. that may be utilized by application(s) running and/or executing on the electronic device 200.

In an example embodiment of the disclosure, the electronic device 200 may implement a security model that may be utilized to control, for example when and/or how, applications running and/or executing on the electronic device 200 operate and/or access particular resources on the electronic device 200 and/or particular storage resources (e.g., file(s) and/or file path(s)). A security model may comprise various security policies and/or permissions that may be stored and/or processed by the electronic device 200. For example, the electronic device 200 may store the policies and/or permission in a memory (e.g., the memory 202) and/or manage and/or execute the policies and/or permissions on a processor (e.g., the main processor 201). A security model may comprise controlled APIs, sandboxing policies (e.g., policies for running and/or executing application on the electronic device 200 in isolation and/or screened to some extent from particular resources and/or storage resources (e.g., file(s) and/or file path(s))), and/or access control policies (e.g., granting and/or denying access to particular resources and/or storage resources (e.g., file(s) and/or file path(s))). The present disclosure is not limited to a particular security model.

In operation, an electronic device 200 may request to download an application from an application store. In this regard, the ACS 206 may request, from the communication module 203, for the communication module 203 to send a request to an application store (e.g., an application store managed by an application server, such as, for example, the application server 120 as depicted in and/or described with respect to FIG. 1) to download a particular application.

The communication subsystem 203 may communication with the application store (and/or the application server). In this regard, the communication subsystem may request from the application store (and/or the application server) an application and/or an application data. The communication subsystem 203 may receive and/or process the application and/or the application data received from the application store (and/or the application server).

In an example embodiment of the disclosure, the application and/or the application data may be received from an application server (e.g., the application server 120) and/or from a developer entity (e.g., the developer entity as depicted in and/or described with respect to FIG. 1). For example, the application server may store and/or mange applications and application data and/or the application server may store and/or manage instructions for purchasing and/or downloading the applications and/or application data from an outside network location (e.g. a network location managed by, for example, a developer entity, such as, for example, the developer entity 130).

The communication subsystem 203 may communicate the received application and/or application data (e.g., instructions for installing, running and/or executing the application, a resource manifest associated with the application, a file whitelist associated with the application) to the ACS 206.

The ACS 206 may receive and/or process the application and/or the application data. For example, the ACS 206 may initiate, process and/or manage the download and/or installation of the application and/or the application data on the electronic device 200 (e.g., in the memory 202). The ACS 206 may also process and/or store application permissions associated with the application, such as for example, a resource manifest and/or a file whitelist.

In operation, the electronic device may control access to particular resources of the electronic device 200 and/or storage resources (e.g., file(s) and/or file path(s)). In this regard, when an application requests access to a particular resource and/or storage resources (e.g., file(s) and/or file path(s)), the ACS 206 may detect and/or process the request. The ACS 206 may request, from the RCM 216, for the RCM 216 to determine whether access to a particular resource and/or storage resources (e.g., file(s) and/or file path(s)) may be granted to the application.

In an example embodiment of the disclosure the RCM 216 may determine whether a particular resource corresponds to a resource item associated with a resource manifest associated with the application that requested access to the particular resource. If the particular resource corresponds to a resource item, the RCM 216 may determine that access to the particular resource may be granted.

In an example embodiment of the disclosure the RCM 216 may determine whether a particular file and/or file path corresponds to a file path of a file item associated with a file whitelist associated with the application that requested access to the particular file and/or file path. If the particular file and/or file path corresponds to a file path of a particular file item, the RCM 216 may determine whether the requested access action (e.g., read file operation, write file operation, etc.) corresponds to a file operation associated with the particular file item. If the particular file and/or file path corresponds to a file path of a particular file item and the requested access action corresponds to a file operation associated with the particular file item, the RCM 216 may determine that access to the particular file and/or file path may be granted.

The ACS 206 may grant access to a particular resource and/or file and/or file path based on the determination by the RCM 216.

Figure 3:
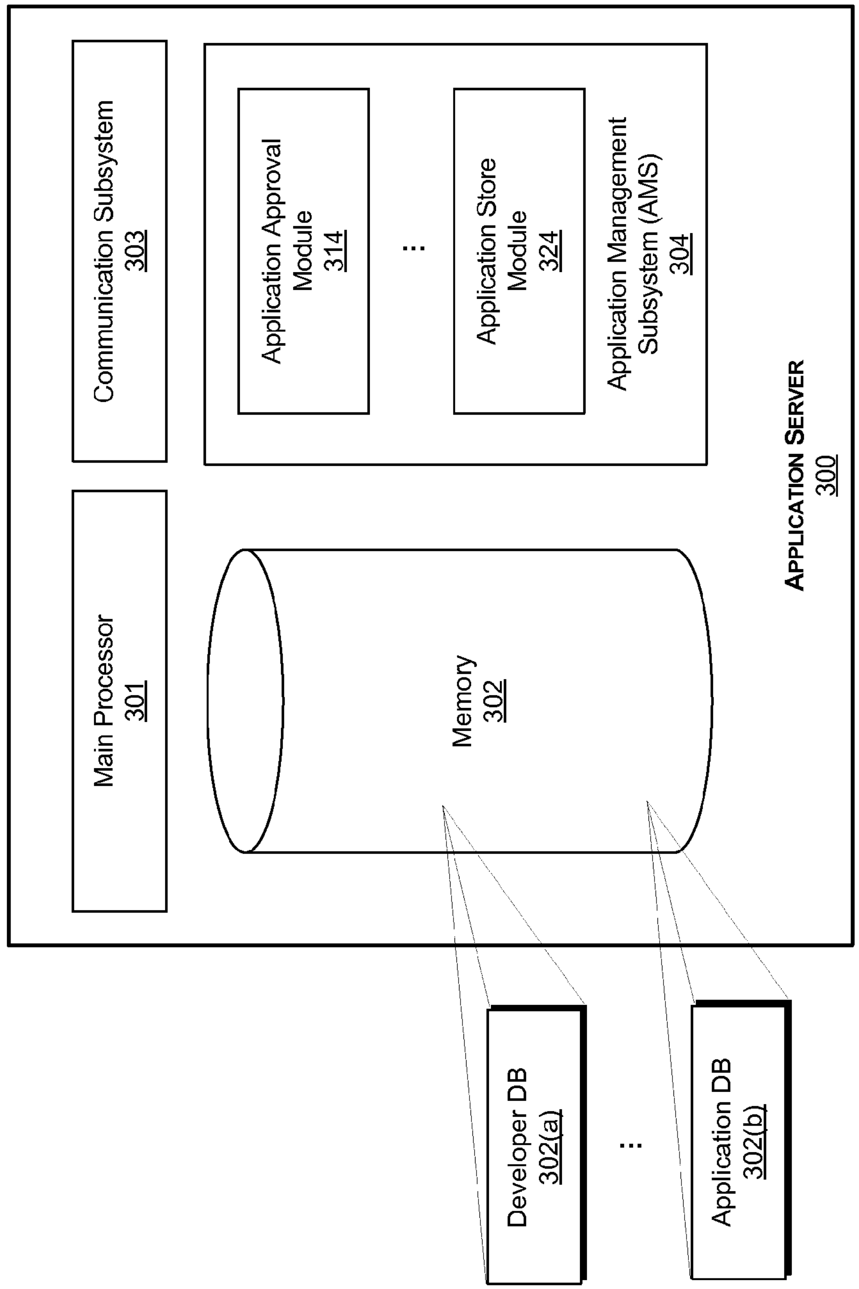
FIG. 3 is a block diagram of an example application server that supports using a file whitelist, in accordance with an example embodiment of the disclosure.

FIG. 3 is a block diagram of example application server that supports using a file whitelist, in accordance with an example embodiment of the disclosure. Referring to FIG. 3, there is shown an application server 300.

The application server 300 may comprise suitable logic, circuitry, code, and/or interfaces that may be operable to implement various aspects of the disclosure. In this regard, the application server 300 may correspond to the application server 120 of FIG. 1. The application server 300 may, for example, comprise a main processor 301, a memory 302, a communication subsystem 303 and/or an application management subsystem (AMS) 304.

The main processor 301 may comprise suitable circuitry, interfaces, logic, and/or code that may be operable to process data, and/or control and/or manage components, operations and/or functions of the application server 300, and/or tasks performed therein. In this regard, the main processor 301 may configure and/or control operations of various components and/or subsystems of the application server 300, such as, for example, the memory 302, the communication subsystem 303 and/or the AMS 304, by utilizing, one or more control signals.

The memory 302 may be substantially similar to, for example, the memory 202 of FIG. 2. In this regard, the memory 302 may comprise suitable logic, circuitry, interfaces, and/or code that that may be operable to enable permanent and/or non-permanent storage, buffering, and/or fetching of data, code and/or other information, which may be used, consumed, and/or processed by the components of the application server 300. In this regard, the memory 302 may be enabled to store executable instructions to manage and/or configure, for example, the main processor 301, the communication subsystem 303 and/or the AMS 304.

The memory 302 may comprise one or more databases such, as for example, a developer database 302(*a*) and/or an application database 302(*b*).

The developer database 302(*a*) may comprise a plurality of database objects each corresponding to a particular developer entity that may be associated with, for example, an individual and/or a company that may develop applications that may be accepted, screened, processed, managed and/or upsold to users of electronic services by, for example, the application server 300. In this regard, each entity may comprise information and/or data, such as, for example, developer account user name, developer account password, developer e-mail address, and/or developer category (e.g., developer of games, business, personal, social and/or networking applications, etc.).

The application database 302(*b*) may comprise a plurality of database objects each corresponding to an application, such as, for example, an application name, application type (e.g., game, business application, personal application, social networking application, etc.) and/or a developer entity associated with the application. The application may be developed by, for example, a developer entity, and/or submitted to the application server 300 for acceptance, screening (e.g., resource manifest evaluation, file whitelist evaluation, etc.), processing, managing and/or upselling (e.g., providing purchasing options to users of electronic devices for purchasing applications submitted by a developer entity to the application server 300).

The communication subsystem 303 may be substantially similar to, for example, the communication subsystem 203 as depicted in and/or described with respect to FIG. 2. In this regard, the communication subsystem 303 may comprise suitable logic, circuitry, interfaces, and/or code that may be operable to communicate data from and/or to the application server 300, such as via one or more wired and/or wireless connections.

The AMS 304 may comprise suitable logic, circuitry, interfaces, and/or code that may be operable to provide application approval services and/or application upsell services. For example the AMS 304 may be enabled to provide application acceptance, screening (e.g., resource manifest evaluation, file whitelist evaluation, etc.), processing, management and/or upsell (e.g., providing purchasing options to users of electronic devices (e.g., the electronic device 110) for purchasing applications submitted by, for example, a developer entity (e.g., the developer entity 130), etc.).

The AMS 304 may comprise, for example an application approval module 314 and/or an application store module 324.

The application approval module 314 may comprise suitable logic, circuitry, code, and/or interfaces that may be operable to provide application approval services (e.g., an approval for release in an application store). For example, the application approval module 314 may receive and/or process application(s) and/or application data (e.g., resource manifest, file whitelist) from a developer entity. In this regard, the application approval module 314 may determine whether the application(s) and/or application data is within one or more a pre-determined criteria (e.g., application quality, content, functionality, description, necessity and/or reasonableness of items associated with a resource manifest and/or a file whitelist, etc.).

In an example embodiment of the disclosure, the application approval module 314 may be operable to determine whether an application may be approved for release in an application store, based on, for example the contents (e.g., items) of a resource manifest and/or file whitelist associated with the application.

The application store module 324 may comprise suitable logic, circuitry, code, and/or interfaces that may be operable to provide application release and/or upsell services (e.g., application purchasing and/or downloading services, etc.) that may be based on application approval services, such as, for example, the application approval services provided by the application approval module 314. In this regard, the application store module 324 may release an application to an application store, based on, for example, an approval by the application approval module 314.

In an example embodiment of the disclosure, the application store module 324 may be operable to provide application browsing, purchasing and/or downloading services to electronic devices (and/or users of electronic devices).

In operation, the application server 300 may be operable to receive, from a developer entity, such as, for example, the developer entity 110, a request for approving an application for release in an application store. In this regard, the communication subsystem 303 may receive and/or process the request. The request may comprise an application, a representation of an application (e.g., executable instructions and/or code that may make the application operable on an electronic device) and/or application data. The application data may, for example, comprise a resource manifest and/or a file whitelist associated with the application. The application data may also comprise other developer and/or application related data (e.g., developer name, developer identifier, application version, application category, application executable instructions, etc.).

In an example embodiment of the disclosure, the request may comprise data and/or information relating to a developer entity. In this regard, the AMS 304 may determine whether the request corresponds to a particular developer entity. For example, the AMS 304 may initiate a search on a developer database, such as, for example, the developer database 302(*a*), to determine a particular entity associated with the request and/or the application subject to the request.

In an example embodiment of the disclosure, the request may comprise data and/or information relating to a particular application (e.g., an existing application which, for example, is already available in the application store and the request comprises, for example, another version and/or release of the existing application and/or a fix and/or an update to the existing application, etc.). In this regard, the AMS 304 may determine whether the request corresponds to a particular application. For example, the AMS 304 may initiate a search on an application database, such as, for example, the application database 302(*b*), to determine a particular application associated with the request and/or the application subject to the request. The AMS 304 may also initiate a search on the application database 302(*b*), to determine a particular developer entity associated with the request and/or the application subject to the request.

The AMS 304, in response to the request, may determine various application approval criteria that may be applicable to the request and/or to the application subject to the request. The criteria may include application quality criteria, such as, for example user experience criteria (e.g., graphics, error-free operation, etc.), application upsell quality criteria (e.g., developer description, application description, application category, etc.), application content criteria (e.g., content approved for a particular category of an application), application security criteria (e.g., content of a resource manifest and/or a file whitelist, etc.) and/or other application functionality criteria.

In an example embodiment of the disclosure, the AMS 304 may determine, based on, for example, the request and/or the application subject to the request, one or more application approval criteria and may request from the application approval module 314 to analyze and/or process all or some application data (e.g., that may be received as part of the request to approve an application for release in an application store) to determine whether the application meets one or more of the one or more application approval criteria.

The AMS 304 may request from the application approval module 314 to analyze and/or process the application data separately with respect to each of the one or more application approval criteria and/or collectively for one or more of the one or more application approval criteria. For example, the AMS 304 may send one request to the application approval module 314 corresponding for each of the one or more application approval criteria (e.g., applicable to the request and/or the application subject to the request based on the determination by the AMS 304). In another example, the AMS 304 may send one request to the application approval module 314 for any combination of the one or more application approval criteria.

In an example me embodiment of the disclosure, the AMS 304 may determine that the request comprises a resource manifest and/or a file whitelist associated with the application subject to the request for approval.

Based on the determination, the AMS 304 may determine that one or more application security criteria apply, such as, for example, necessity and/or reasonableness of contents (e.g., items associated with the resource manifest and/or the file whitelist).

In this regard, AMS 304 may request from the application approval module 314 for the application approval module 314 to analyze the resource manifest, the file whitelist and/or their respective contents to determine whether they meet one or more application security criteria.

In an example embodiment of the disclosure, the application approval module 314 may analyze the resource manifest to determine whether the contents of the resource manifest (e.g., resource items associated with the resource manifest) are, for example, necessary and/or reasonable with respect to resources of an electronic device to which an access may be requested during an operation and/or execution of the application.

In an example embodiment of the disclosure, the application approval module 314 may analyze the file whitelist to determine whether the contents of the file whitelist (e.g., file items associated with the file whitelist) are, for example, necessary and/or reasonable with respect to file(s) and/or file path(s) to which an access may be requested during an operation and/or execution of the application. The application approval module 314 may determine whether one or more file operations corresponding to particular file(s) and/or file path(s) associated with file items on the file whitelist are also necessary and/or reasonable.

The application approval module 314 may communicate with the AMS 304. In this regard, the application approval module 314 may send to the AMS 304 data and/or information indicative of whether one or more application approval criteria may be met (e.g., the one or more application approval criteria that where the subject of a request from the AMS 304 to the application approval module 314).

The AMS 304 may determine, based on, for example, the data and/or information received from the application approval module 314 whether an application may be released to the application store.

In an example embodiment of the disclosure, the AMS 304 may add and/or modify an entry in an application database, such as, for example the application database 302(*b*), where the entry may indicate that the application may or may not be approved for release in an application store.

The AMS 304 may request from the communication subsystem 303 for the communication subsystem 303 to send, to the developer entity, a notification, which may comprise application receipt data. The application receipt data may comprise data and/or information indicative of whether the application may be released to the application store.

In an example embodiment of the disclosure, the application server 300 may use a variety of different communication methods to communicate with the developer entity. For example, the communication subsystem 303 may, based on, for example, a request from the AMS 304, send, to the developer entity, an e-mail message (e.g., to an e-mail address associated with the developer entity, where the e-mail address may be retrieved from, for example, the developer database 302(*a*)) and/or another message that may be received and/or retrieved by the developer entity (e.g., a message in an application that may support communication between the developer entity and the application server 300, through, for example, an API and/or on-line interface (e.g., web browser interface).

In operation, the application server 300 may be operable to release an application to an application store. The application may be released to an application store if, for example, the application was approved for release during an approval process as performed by, for example, the ACS 304 and/or the application approval module 314. In this regard, the AMS 204 may request from the application store module 324 for the application store module 324 to release an approved application to an application store. For example, the application store module 324 may add and/or modify an entry in an application database, such as, for example the application database 302 (*b*), where the entry may indicate that the application may be available in the application store (e.g., available for browsing, purchasing, downloading, etc.).

In operation, the application server 300 may be operable to receive, from an electronic device, a request to purchase and/or download an application from an application store. In this regard, the communication subsystem 303 may receive and/or process the request and may send the request (processed or unprocessed) to the AMS 304. The request may comprise download related data (e.g., data about the requested application, the type of the operating system on the electronic device, the type of the electronic device, etc.) that may be relevant to the purchasing and/or downloading of the application. The AMS 304 may analyze the request to prepare the application and/or application data for download to the electronic device. For example, the AMS 304 may determine a version of the application that may have to be prepared for purchasing and/or download, based on, for example, an operating system of the electronic device, the type of the electronic device (e.g., smartphone, tablet, etc.).

In an example embodiment of the disclosure, the AMS 304 may send to the electronic device, the application, executable instructions for downloading and/or installing the application (e.g., from an application server, such as, for example, the application server 300 or a third-party server, such as, for example, a developer entity associated with the application) and/or application data (e.g., a resource manifest, a file whitelist, etc.).

The components of the application server 300, such as, for example, the main processor 301, the memory 302, the communication subsystem 303 and/or the AMS 304 may be implemented in an integrated or a distributed system. An integrated system may be implemented, for example, on one computer, server, machine or device, where the integrated system may be configured to perform some or all of the functions, features and/or operations of the main processor 301, the memory 302, the communication subsystem 303 and/or the AMS 304 as described herein. A distributed system may be implemented with multiple components (e.g., computers, servers, machines and/or devices), where each of the multiple components may be configured to perform some or all of the functions, features and/or operations of the main processor 301, the memory 302, the communication subsystem 303 and/or the AMS 304 as described herein. Each function, feature and/or operation may be implemented on one or more of the components of the distributed system. For example, a specific feature, function and/or operation may be implemented on one component of the distributed system or it may be implemented across multiple components of the distributed system.

Figure 4:
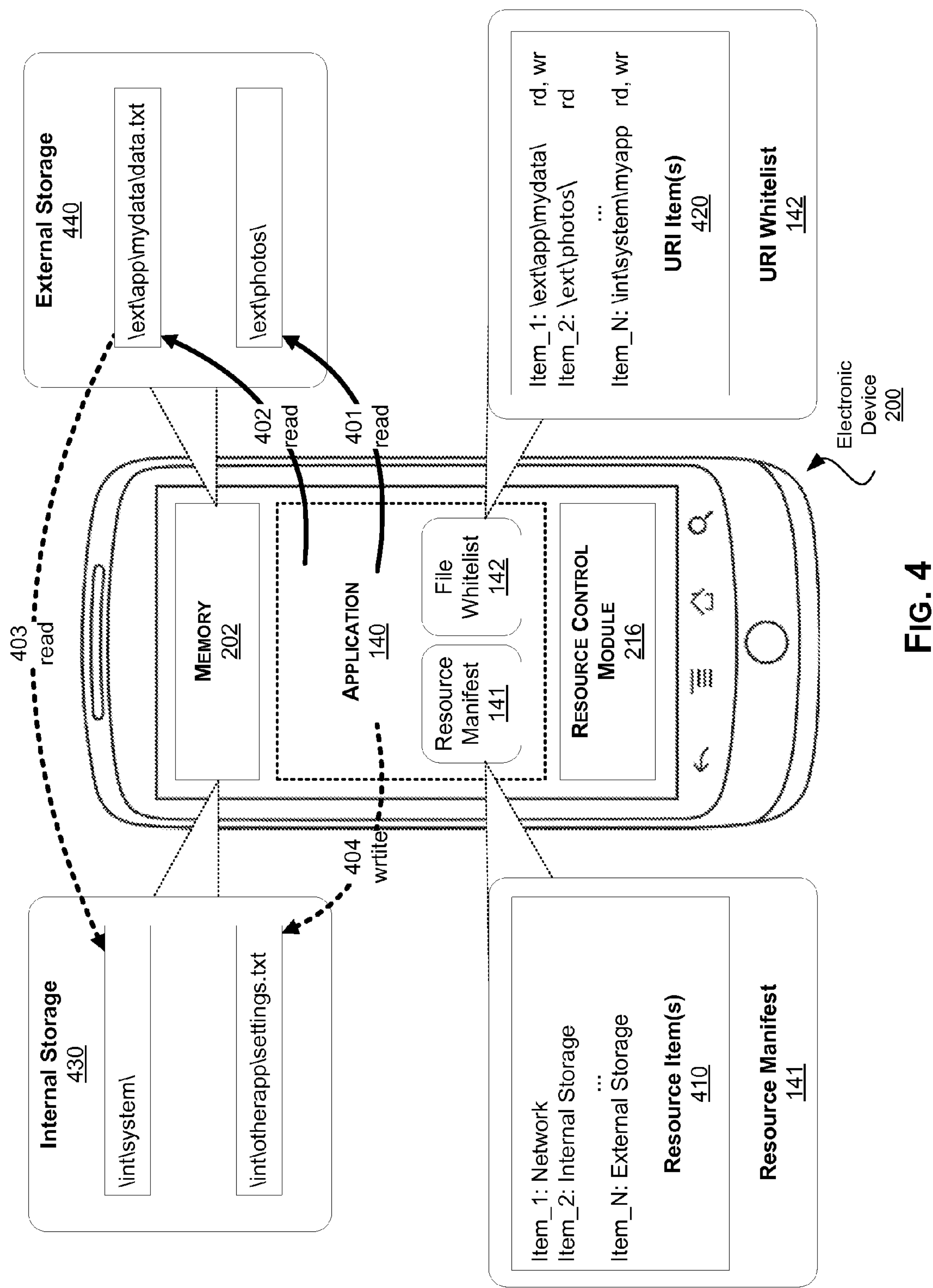
FIG. 4 is a block diagram of an example resource access control using a file whitelist, in accordance with an example embodiment of the disclosure.

FIG. 4 is a block diagram of an example resource access control using a file whitelist, in accordance with an example embodiment of the disclosure. Referring to FIG. 4, there is shown an electronic device (e.g., the electronic device 200 as depicted in and/or described with respect to FIG. 2) and/or an application (e.g., the application 140 as depicted in and/or described with respect to FIG. 1) that may be operating on the electronic device.

The application (e.g., the application 140) may be associated with a resource manifest (e.g., the resource manifest 141 as depicted in and/or described with respect to FIG. 1) and/or a file whitelist (e.g., the file whitelist 142 as depicted in and/or described with respect to FIG. 1).

The resource manifest 141 may comprise one or more resource items, such as, for example, the resource item(s) 410. A resource item (e.g., resource item(s) 410) may correspond to a resource on the electronic device (e.g., the electronic device 200) on which the applications is operating. Example resource item(s) may comprise example resource items(s) 410. The resource item(s) 410 may comprise resource items 1 though N (e.g., Item 1, Item_2, . . . Item_N). An example "Item_1" may correspond to network (e.g., an internet network, a Wi-Fi connection, a LAN connection, etc.). An example "Item_2" may correspond to internal storage (e.g. "\int\"). An example "Item_N" may correspond to external storage (e.g., "\ext\").

The file whitelist 142 may comprise one or more file items, such as, for example, the file item(s) 420. A file item may comprise a file path and one or more file operations associated with the file path. The file path(s) define file(s) and/or file path(s) to which the application may request access though an access action (e.g., read file operation, write file operation, etc.). The file operation(s) define access actions that may be approved with respect to a particular file path with which they are associated. The access may be facilitated by the electronic device (e.g., the electronic device 200), if, for example, access to storage (e.g., internal storage, external storage, etc.) is granted to the application by the electronic device. Example file item(s) may comprise example file items(s) 420. The file item(s) 420 may comprise file items 1 though N (e.g., Item 1, Item_2, . . . Item_N). An example "Item_1" may correspond to an example external storage file and/or file path "\ext\app\mydata\" associated with a read file operation "rd" and a write file operation "wr." An example "Item_2" may correspond to an example external storage location "\ext\photos\ associated with a read file operation "rd." An example "Item_N" may correspond to an example internal storage location "\int\system\myapp\" associated with read file operation "rd" and a write file operation "wr."

In operation, the applications 140 may request from the electronic device 200 to access a particular file and/or file path through an example request 401, 402 and/or 404. The electronic device 200 may receive and/or process the request through, for example, a resource control module, such as for example, the resource control module (RCM) 216 as depicted in and/or described with respect to FIG. 2.

In an example embodiment of the disclosure, the application 140 may request to access one or more files and/or file paths (e.g., request(s) 401, 402, 404). For each of the example file and/or file path access requests (e.g., 401, 402, 404), the RCM 216 may analyze the resource manifest 141. The RCM 216 may determine that for the example request 401 and/or 402, the application may be granted access to external storage based on the resource Item_N which corresponds to external storage. The RCM 216 may determine that for the example request 404, the application may be granted access to internal storage based on the resource Item_2 of the resource item(s) 410 which corresponds to internal storage.

In the example access request 401, the application 140 may request read access (e.g., read file operation) on an example external storage file and/or file path "\ext\photos\". The RCM 216 may analyze the file whitelist 142 and may determine that the application may be granted read access to the example external storage file and/or file path, because, for example, the example external storage file and/or file path corresponds to a file path of the example file Item_2 which is also associated with a read file operation. In another example (not shown), if the application requested write access (e.g., a write file operation) to the same example external storage file and/or file path, the RCM 216 would deny the write access because the file path of the a file item corresponding to the example external storage file and/or file path (the file Item_2 of the file item(s) 420) is associated with a read file operation and not with a write file operation.

In the example access request 402, the application 140 may request read access (e.g., read file operation) on an example external storage file and/or file path "\ext\app\mydata\data.txt". The RCM 216 may analyze the file whitelist 142 and may determine that the application may be granted access to the example external storage file and/or file path, because, for example, the example external storage file and/or file path corresponds to a pattern of external storage file and/or file path corresponding to a file path example file Item_1 of the file item(s) 420, which is also associated with a read file operation. In an example embodiment of the disclosure, the RCM 216 may monitor the external storage access by the application 140 to, for example, determine whether the access to the example external storage file and/or file path "\ext\app\mydata\data.txt" results in fact in access to the same example external storage file and/or file path. In a case, where, for example, upon access to the approved example external storage file and/or file path (e.g., "\ext\app\mydata\data.txt"), a redirect (e.g., intermediate redirect request 403, such as, for example, via a symbolic link) occurs, the RCM 216 may detect the redirect (e.g., to "\int\system\") and may analyze whether the redirect may result in access to a file and/or file path that may correspond to an approved file item. In this example, the RCM 216 may determine that the redirect request 403 may result in access to an example internal storage file and/or file path "\int\system\". The RCM 216 may analyze the file whitelist 142 and may determine that the application may not be granted read access on the example redirect internal storage file and/or file path, because, for example, the example redirect internal storage file and/or file path does not corresponds to a file path of any of the example file item(s) 420.

In the example access request 404, the application 140 may request write access (e.g., write file operation) on an example internal storage file and/or file path "\int\otherapp\settings.txt", which may be associated with a different application. The RCM 216 may analyze the file whitelist 142 and may determine that the application may not be granted write access to the example internal storage file and/or file path, because, for example, the example internal storage file and/or file path does not corresponds to a file path of any of the example file item(s) 420.

Figure 5:
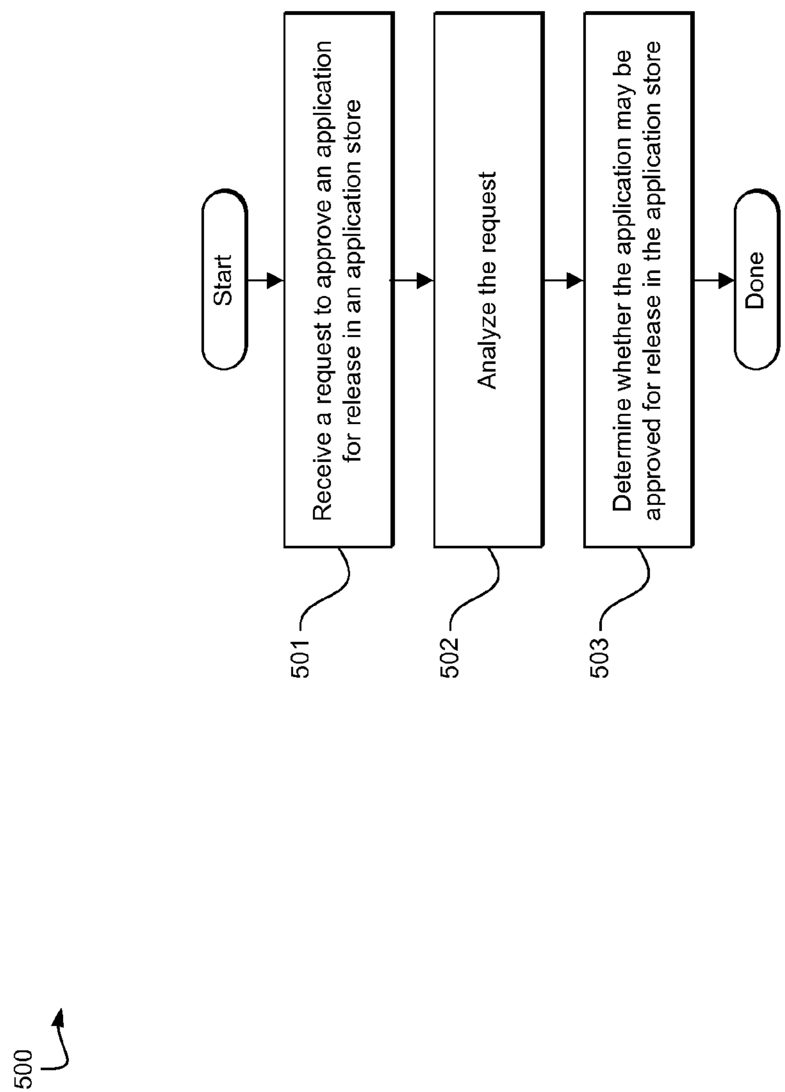
FIG. 5 is a flow diagram of example steps of a method for using a file whitelist, in accordance with an example embodiment of the disclosure.

FIG. 5 is a flow diagram of example steps of a method for using a file whitelist, in accordance with an example embodiment of the disclosure. Referring to FIG. 5, an example method 500 is shown comprising a plurality of example steps for using a file whitelist. The example steps of the example method 500 may be performed by an application server, such as, for example, the application server 120 and/or 300.

In an example step 501, a request to approve an application for release in an application store may be received. The request may be received from an application developer (e.g., a developer entity, such as, for example, the developer entity 130). The request may comprise the application and/or application data. The application data may comprise a resource manifest and/or a file whitelist.

In an example step 502, the request may be analyzed based on, for example, the application data. For example, the resource manifest and/or the file whitelist may be analyzed. In this regard, a determination may be made whether contents (e.g., items) of the resource manifest and/or the file whitelist may be necessary and/or reasonable with respect to, for example, the application type, category, etc.

In an example step 503, a determination whether the application may be approved for release in the application store may be made based on, for example, the determination made in the example step 502. For example, if the resource items associated with the resource manifest and/or the file items associated with the file whitelist are necessary and/or reasonable the application may be approved for release in the application store. The present disclosure is not limited to the steps in the example method 500.

Figure 6:
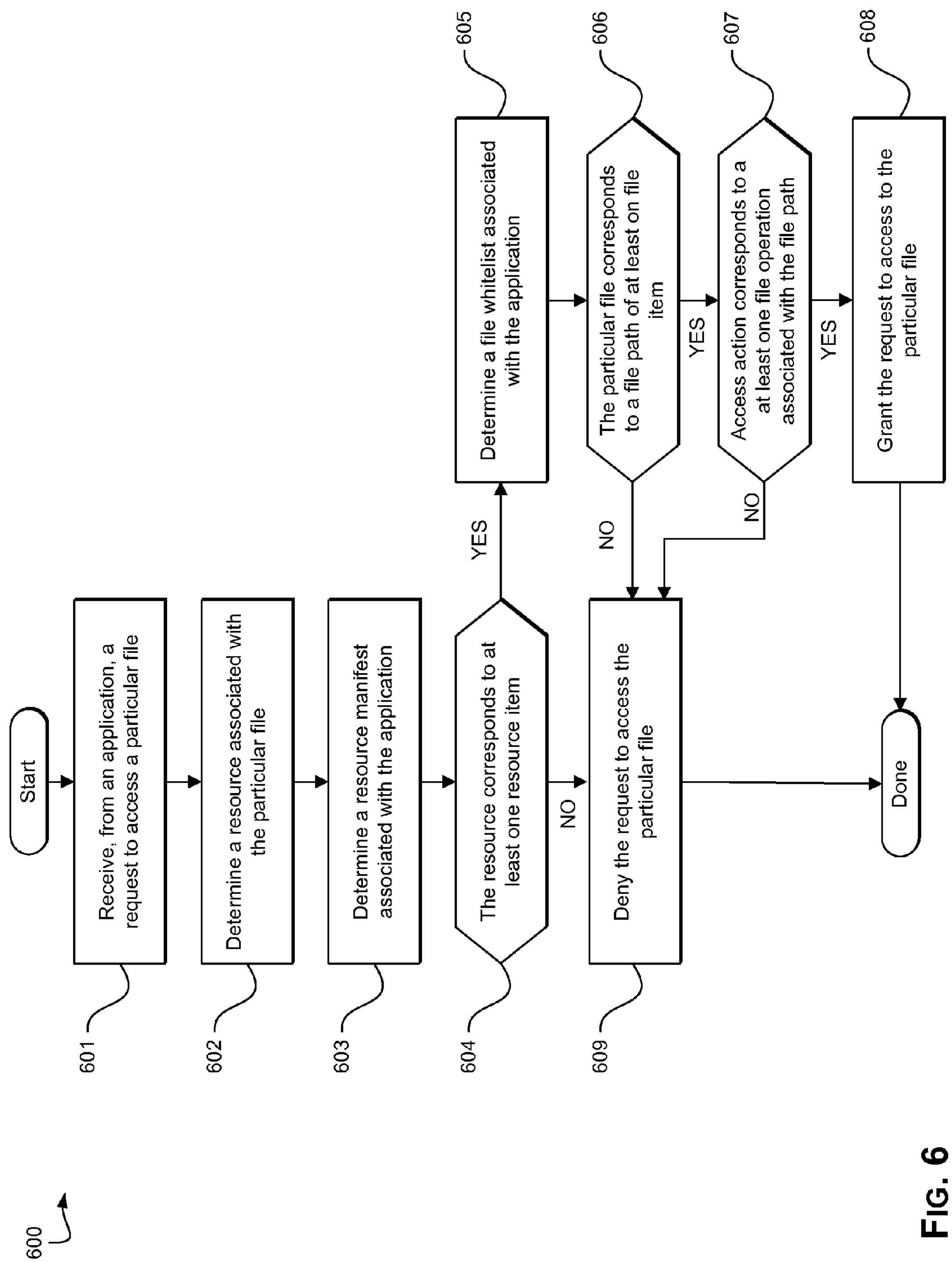
FIG. 6 is a flow diagram of example steps of another method for using a file whitelist, in accordance with an example embodiment of the disclosure.

FIG. 6 is a flow diagram of example steps of another method for using a file whitelist, in accordance with an example embodiment of the disclosure. Referring to FIG. 6, an example method 600 is shown comprising a plurality of example steps for using a file whitelist. The example steps of the example method 600 may be performed by an electronic device, such as, for example, electronic device 110 and/or 200.

In an example step 601, a request to access a particular file may be received from an application. For example, an application running and/or executing on an electronic device may request access to a particular file and/or file path.

In an example step 602, a determination of a resource associated with the particular file may be made. For example, a particular file and/or file path may be associated with external storage. In this regard, the determination may be made that access to the particular file and/or file path requires access to external storage (e.g., external storage may correspond to a resource on the electronic device).

In an example step 603, a determination of a resource manifest associated with the application may be made. The resource manifest may comprise one or more resource items, where some or all of the one or more resource items may correspond to one or more resources of the electronic device (e.g., camera interface, contest list, network, internal storage, external storage, memory card storage, SD card storage, etc.).

In an example step 604, a determination of whether the resource corresponds to at least one of the one or more resource items may be made. In this regard, the resource determined in the example step 602 may be compared with one or more resource items in the resource manifest to determine whether the resource corresponds to at least one of the one or more resource items. For example, if the resource determined in the example step 602 is external storage (e.g., access to the particular file and/or file path requires access to external storage) and, for example, one of the one or more resource items also corresponds to external storage, then a determination may be made that the resource corresponds to at least one of the one or more resource item (e.g., an resource item corresponding to external storage).

If the resource corresponds to at least one of the one or more resource items, the example steps continue at the example step 605. If the resource does not correspond to any one of the one or more resource items, the example steps continue at the example step 609.

In an example step 605, a determination of a file whitelist associated with the applications may be made. The file whitelist may comprise one or more file items.

In an example step 606, a determination whether the particular file corresponds to a file path of at least one of the one or more file items may be made. In this regard, the particular file and/or file path to which access may have been requested in the example step 601 may be compared with one or more file paths corresponding to the one or more file items in the file whitelist to determine whether the particular file and/or file path corresponds to a file path of at least one of the one or more file items. If the particular file corresponds to a file path at least one of the one or more file items, the example steps continue at the example step 607. If the particular file does not correspond to a file path of any one of the one or more file items, the example steps continue at the example step 609.

In an example step 607, a determination whether an access action corresponds to at least one file operation of the file path determined in the example step 606. In this regard, the access action (e.g., read file operation, write file operation, etc.) may be compared with one or more file operations of the file item corresponding to the file path determined in the example step 606. If the access operation corresponds to at least one file operation of the file item corresponding to the file path determined in the example step 606, the example steps continue at the example step 608. If the access operation does correspond to any one file operation of the file item corresponding to the file path determined in the example step 606, the example steps continue at the example step 609.

In an example step 608, the request to access the particular file may be granted. For example, the application may be allowed to access the particular file.

In an example step 609, the request to access the particular file may be denied. For example, the application may not be allowed to access the particular file. In an example embodiment of the disclosure, a notification may be presented to a user of the electronic device to inform the user that the application requested to access the particular file and that the access to the particular file was denied. The notification may comprise information relating to a reason why the application was denied access to the particular file. The notification may comprise an option for the user to request from the electronic device to bypass application permission (e.g., as defined by the resource manifest and/or the file whitelist associated with the applications) and allow access to the particular file (e.g., even if the particular file may not correspond to a file path any one of the file items associated with the file whitelist). The present disclosure is not limited to the steps in the example method 600.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for using a file whitelist.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computing device comprising one or more memory units that store computer code and/or one or more processor units coupled to the one or more memory units. The one or more processor units may execute the computer code stored in the one or more memory units to adapt the computing device to enable the implementation of the system(s) and/or method(s) herewith described.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:

in a computing device:

receiving, by an application store, a request from an application developer to approve an application for release in the application store, wherein the application is associated with the application developer and wherein the request comprises application data and wherein the application data comprises a resource manifest and a file whitelist, wherein the resource manifest comprises one or more resource items and wherein the file whitelist comprises one or more file items;

analyzing the request based on application data;

determining whether the application may be released in the application store based on the analyzing; and releasing an approved application to the application store in response to the request to approve the application for release in the application store, wherein the approved application comprises an approved resource manifest and an approved file whitelist, wherein the approved resource manifest comprises one or more approved resource items, wherein the approved file whitelist comprises one or more approved file items, and wherein at least one of the file items does not correspond to any of the one or more approved file items.

2. The method of claim 1, further comprising:

communicating, to the application developer, application receipt data, wherein the application receipt data comprises data indicative of whether the application was approved for release in an application store.

3. The method of claim 2, wherein the application data comprises information data and option data;

wherein the information data indicates that the application may be released in the applications store as an approved application; and wherein the option data provides an option to the application developer to approve the release of the application in the application store as the approved application.

4. The method of claim 3, further comprising:

receiving modification approval data, from the application developer, wherein the modification approval data comprises an approval by the application developer to release the application in the application store as the approved application.

5. The method of claim 1, further comprising:

receiving, from an electronic device, a request to access the application; and sending, to the electronic device, a response to the request to access the application, wherein the response comprises the application data.

6. A method, comprising:

in an electronic device comprising a memory, wherein the memory comprises an operating system;

receiving, from an application, a request to access a particular file, wherein the application is running in the operating system, wherein the request comprises an access action;

determining a resource associated with the particular file;

determining a resource manifest associated with the application, wherein the resource manifest comprises one or more resource items;

determining whether the resource corresponds to at least one of the one or more resource items; and if the resource corresponds to at least one of the one or more resource items:

determining a file whitelist associated with the application, wherein the file whitelist comprises one or more file items, wherein each of the one or more file items comprises a file path and one or more file operations associated with the file path;

determining whether the particular file corresponds to a file path of at least one of the one or more file items;

if the particular file corresponds to a file path of at least one of the one or more file items:

determining whether the access action corresponds to at least one file operation associated with the file path, if the access action corresponds to at least one file operation associated with the file path, granting the request to access the particular file;

if the access action does not correspond to at least one file operation associated with the file path, denying the request to access the particular file; and if the particular file does not correspond to a file path of any one of the one or more file items, denying the request to access the particular file.

7. The method of claim 6, further comprising:

if the resource does not correspond to any one of the one or more resource items, denying the request to access the particular file.

8. The method of claim 6, further comprising:

if the particular file does not correspond to a file path of any one of the one or more file items, presenting a notification on the electronic device, wherein the notification comprises information indicative of the denial of the request to access the particular file.

9. A system, comprising:

one or more hardware processors, the one or more hardware processors being operable to:

receive, by an application store, a request from an application developer to approve an application for release in the application store, wherein the application is associated with the application developer and wherein the request comprises application data and wherein the application data comprises a resource manifest and a file whitelist, wherein the resource manifest comprises one or more resource items and wherein the file whitelist comprises one or more file items;

analyze the request based on application data;

determine whether the application may be released in the application store based on the analyzing; and release an approved application to the application store in response to the request to approve the application for release in the application store, wherein the approved application comprises an approved resource manifest and an approved file whitelist, wherein the approved resource manifest comprises one or more approved resource items, wherein the approved file whitelist comprises one or more approved file items, and wherein at least one of the file items does not correspond to any of the one or more approved file items.

10. The system of claim 9, wherein the one or more hardware processors is further operable to:

communicate, to the application developer, application receipt data, wherein the application receipt data comprises data indicative of whether the application was approved for release in an application store.

11. The system of claim 10, wherein the application data comprises information data and option data;

wherein the information data indicates that the application may be released in the applications store as an approved application, and wherein the option data provides an option to the application developer to approve the release of the application in the application store as the approved application.

12. The system of claim 11, wherein the one or more hardware processors is further operable to:

receive modification approval data, from the application developer, wherein the modification approval data comprises an approval by the application developer to release the application in the application store as the approved application.

13. The system of claim 12, further comprising:

receive, from an electronic device, a request to access the application; and send, to the electronic device, a response to the request to access the application, wherein the response comprises the application data.

14. A system, comprising:

one or more hardware processors, the one or more hardware processors being operable to:

receive, from an application, a request to access a particular file, wherein the request comprises an access action;

determine a resource associated with the particular file;

determine a resource manifest associated with the application, wherein the resource manifest comprises one or more resource items;

determine whether the resource corresponds to at least one of the one or more resource items; and if the resource corresponds to at least one of the one or more resource items:

determine a file whitelist associated with the application, wherein the file whitelist comprises one or more file items, wherein each of the one or more file items comprises a file path and one or more file operations associated with the file path;

determine whether the particular file corresponds to a file path of at least one of the one or more file items;

if the particular file corresponds to a file path of at least one of the one or more file items:

determine whether the access action corresponds to at least one file operation associated with the file path, if the access action corresponds to at least one file operation associated with the file path, grant the request to access the particular file;

if the access action does not correspond to at least one file operation associated with the file path, deny the request to access the particular file; and if the particular file does not correspond to a file path of any one of the one or more file items, deny the request to access the particular file.

15. The system of claim 14, wherein the one or more hardware processors is further operable to:

if the resource does not correspond to any one of the one or more resource items, deny the request to access the particular file.

16. The system of claim 14, wherein the one or more hardware processors is further operable to:

if the particular file does not correspond to a file path of any one of the one or more file items, present a notification on the electronic device, wherein the notification comprises information indicative of the denial of the request to access the particular file.

* * * * *